United States Patent
Krishnan et al.

(10) Patent No.: US 12,041,534 B2
(45) Date of Patent: Jul. 16, 2024

(54) NETWORK MEASUREMENTS FOR ENHANCED MACHINE LEARNING MODEL TRAINING AND INFERENCE

(71) Applicant: QUALCOMM Incorporated, San Diego, CA (US)

(72) Inventors: Shankar Krishnan, San Diego, CA (US); Xipeng Zhu, San Diego, CA (US); Taesang Yoo, San Diego, CA (US); Rajeev Kumar, San Diego, CA (US); Gavin Bernard Horn, La Jolla, CA (US); Aziz Gholmich, Del Mar, CA (US); Eren Balevi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 17/412,634

(22) Filed: Aug. 26, 2021

(65) Prior Publication Data

US 2023/0064266 A1 Mar. 2, 2023

(51) Int. Cl.
*H04W 48/16* (2009.01)
*H04W 24/10* (2009.01)
(Continued)

(52) U.S. Cl.
CPC ........... *H04W 48/16* (2013.01); *H04W 24/10* (2013.01); *H04W 48/08* (2013.01); *H04W 72/542* (2023.01)

(58) Field of Classification Search
CPC ....... H04L 5/0048; H04L 41/16; H04L 43/55; H04L 43/0864; H04W 8/24; H04W 24/08;
(Continued)

(56) References Cited

U.S. PATENT DOCUMENTS

| | | | | |
|---|---|---|---|---|
| 11,228,573 | B1 * | 1/2022 | Rangasamy | ...... H04L 12/40006 |
| 2015/0319077 | A1 * | 11/2015 | Vasseur | ................... H04L 45/44 370/238 |

(Continued)

OTHER PUBLICATIONS

3GPP TR 23.700-80: "3rd Generation Partnership Project, Technical Specification Group Services and System Aspects, Study on 5G System Support for AI/ML-based Services (Release 18)", 3GPP Standard, Technical Report, 3rd Generation Partnership Project, Mobile Competence Centre, 650, Route Des Lucioles, F-06921 Sophia-Antipolis Cedex, France, No. V0.3.0, May 30, 2022, pp. 1-169, XP052182568, Whole Clause 6.3 with Reference to Fig. 6.3.2.1-1.
Intel Corporation: "AI/ML Enabled RAN and NR Air Interface", 3GPP TSG RAN Release 18 Workshop, RWS-210373, 3rd Generation Partnership Project, Mobile Competence Centre, 650, Route Des Lucioles, F-06921 Sophia-Antipolis Cedex, France, vol. TSG RAN, No. 20210628-20210702, Jun. 7, 2021, 12 Pages, XP052025926, Slides 7 & 10.

(Continued)

*Primary Examiner* — Michael Thier
*Assistant Examiner* — Prince A Mensah
(74) *Attorney, Agent, or Firm* — Holland & Hart LLP

(57) ABSTRACT

Methods, systems, and devices for wireless communications are described. A user equipment (UE) may communicate with a network entity within a wireless communications network. The UE may transmit a request for information to the network entity and, in response to the request, the UE may receive the requested information from the network entity. For example, the UE may request data from one or more data repositories associated with the network entity. In some examples, the information request may be associated with one or more measurements associated with operations of the network. In some instances, the UE may use a machine learning model to perform training or inference based on the information associated with the one or more measurements.

26 Claims, 19 Drawing Sheets

(51) Int. Cl.
  *H04W 48/08* (2009.01)
  *H04W 72/542* (2023.01)
(58) Field of Classification Search
  CPC ............. H04W 24/10; H04W 28/0842; H04W 28/0908; H04W 46/08; H04W 48/18; H04W 72/542
  See application file for complete search history.

(56) References Cited

U.S. PATENT DOCUMENTS

| | | | | |
|---|---|---|---|---|
| 2016/0037402 | A1* | 2/2016 | Rosa | H04W 36/04 370/331 |
| 2018/0249417 | A1* | 8/2018 | Fujishiro | H04W 24/10 |
| 2021/0076311 | A1* | 3/2021 | Fujishiro | H04W 4/06 |
| 2021/0084007 | A1* | 3/2021 | Cao | H04W 8/18 |
| 2021/0091838 | A1 | 3/2021 | Bai et al. | |
| 2022/0240213 | A1* | 7/2022 | Ly | H04W 60/04 |
| 2022/0335337 | A1* | 10/2022 | Kovács | G06N 20/00 |
| 2022/0353803 | A1* | 11/2022 | Wang | G06N 20/00 |
| 2023/0006913 | A1* | 1/2023 | Lo | H04L 43/55 |
| 2023/0040284 | A1* | 2/2023 | Ali-Tolppa | G06N 20/00 |
| 2023/0115368 | A1* | 4/2023 | Parichehrehteroujeni | G06N 20/00 706/46 |
| 2023/0245000 | A1* | 8/2023 | Yang | G06N 3/04 706/12 |

OTHER PUBLICATIONS

Intel Corporation: "High Level Principle and Functional Framework of AI/ML Enabled NG-RAN Network", 3GPP TSG-RAN WG3 Meeting #113-e, R3-213468, 3rd Generation Partnership Project, Mobile Competence Centre, 650, Route Des Lucioles, F-06921 Sophia-Antipolis Cedex, France vol. RAN WG3, No. Electronic meeting, Aug. 16, 2021-Aug. 26, 2021, Aug. 6, 2021, 08 Pages, XP052035296, Whole clauses 2.1-2.2.

International Search Report and Written Opinion—PCT/US2022/041693—ISA/EPO—Nov. 18, 2022.

Samsung: "5SEAS: 5G System Evolution for AI/ML-based Services", S2-2104569, 3rd Generation Partnership Project, Mobile Competence Centre, 650, Route Des Lucioles, F-06921 Sophia-Antipolis Cedex, France No. 20210501, May 11, 2021, 5 Pages, XP052009729, Slide 4.

* cited by examiner

NETWORK MEASUREMENTS FOR ENHANCED MACHINE LEARNING MODEL TRAINING AND INFERENCE

FIELD OF TECHNOLOGY

The following relates to wireless communications, including network measurements for enhanced machine learning model training and inference.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some examples of a wireless communications system, a wireless communications network may collect information to determine the network performance at various locations throughout the network coverage area. In some examples, information collection techniques for wireless communications networks may be deficient.

SUMMARY

The described techniques relate to improved methods, systems, devices, and apparatuses that support network measurements for enhanced machine learning model training and inference. Generally, a user equipment (UE) may communicate with a network entity within a wireless communications network. The UE may transmit a request for information to the network entity and, in response to the request, may receive the requested information from the network entity or one or more other network entities. For example, the UE may request data from one or more data repositories associated with the network entity. In some examples, the information request may be associated with one or more measurements associated with operations of the network. In some instances, the UE may perform training of a machine learning model, inference using a machine learning model, or both based on the information associated with the one or more measurements.

A method for wireless communication at a user equipment (UE) is described. The method may include transmitting, to a network entity within a wireless communications network, a request for information associated with one or more measurements associated with operation of the wireless communications network, receiving, from the network entity and in response to the request, the information associated with the one or more measurements, and performing a training or inference operation using a machine learning model at the UE, the training or inference operation based on the information associated with the one or more measurements.

An apparatus for wireless communication at a UE is described. The apparatus may include a processor, memory coupled with the processor, and instructions stored in the memory. The instructions may be executable by the processor to cause the apparatus to transmit, to a network entity within a wireless communications network, a request for information associated with one or more measurements associated with operation of the wireless communications network, receive, from the network entity and in response to the request, the information associated with the one or more measurements, and perform a training or inference operation using a machine learning model at the UE, the training or inference operation based on the information associated with the one or more measurements.

Another apparatus for wireless communication at a UE is described. The apparatus may include means for transmitting, to a network entity within a wireless communications network, a request for information associated with one or more measurements associated with operation of the wireless communications network, means for receiving, from the network entity and in response to the request, the information associated with the one or more measurements, and means for performing a training or inference operation using a machine learning model at the UE, the training or inference operation based on the information associated with the one or more measurements.

A non-transitory computer-readable medium storing code for wireless communication at a UE is described. The code may include instructions executable by a processor to transmit, to a network entity within a wireless communications network, a request for information associated with one or more measurements associated with operation of the wireless communications network, receive, from the network entity and in response to the request, the information associated with the one or more measurements, and perform a training or inference operation using a machine learning model at the UE, the training or inference operation based on the information associated with the one or more measurements.

Some examples of the method, apparatuses, and non-transitory computer-readable medium described herein may further include operations, features, means, or instructions for transmitting, to the network entity, a network measurement configuration request indicating the one or more measurements and receiving, from the network entity, a network measurement configuration response indicating an acceptance to measure the one or more measurements, where transmitting the request for information may be in response to the network measurement configuration response.

Some examples of the method, apparatuses, and non-transitory computer-readable medium described herein may further include operations, features, means, or instructions for transmitting, to the network entity, a network measurement configuration request indicating the one or more measurements and receiving, from the network entity, a network measurement configuration response indicating an acceptance to measure a subset of the one or more measurements, where transmitting the request for information includes transmitting the request for information associated with the subset of the one or more measurements.

Some examples of the method, apparatuses, and non-transitory computer-readable medium described herein may further include operations, features, means, or instructions for transmitting, to the network entity, a request to subscribe to a network measurement configuration associated with the one or more measurements, where receiving the information associated with the one or more measurements may be in response to the request to subscribe to the network measurement configuration.

Some examples of the method, apparatuses, and non-transitory computer-readable medium described herein may further include operations, features, means, or instructions for transmitting, to the network entity, a request to unsubscribe from a subset of the one or more measurements associated with the network measurement configuration.

In some examples of the method, apparatuses, and non-transitory computer-readable medium described herein, the request to subscribe to the network measurement configuration includes at least one of an indication of the one or more parameters, an indication of a periodic notification process, an indication of an event-triggered notification process, or any combination thereof.

In some examples of the method, apparatuses, and non-transitory computer-readable medium described herein, transmitting a request for information may include operations, features, means, or instructions for transmitting the request for information using a user plane connection via an Internet Protocol (IP) address of the network entity.

In some examples of the method, apparatuses, and non-transitory computer-readable medium described herein, transmitting a request for information may include operations, features, means, or instructions for transmitting the request for information using a control plane connection via a coordination entity associated with the network entity.

In some examples of the method, apparatuses, and non-transitory computer-readable medium described herein, transmitting a request for information may include operations, features, means, or instructions for transmitting the request for information using a service-based connection based on an application programming interface associated with the network entity.

Some examples of the method, apparatuses, and non-transitory computer-readable medium described herein may further include operations, features, means, or instructions for predicting a throughput value, a network load value, a downlink queue length, a downlink delay value, or any combination thereof based on performing the training or inference operation.

In some examples of the method, apparatuses, and non-transitory computer-readable medium described herein, the network entity includes at least one of an analytics and data repository function, a centralized unit data repository function, a centralized unit of a base station, a distributed unit of a base station, an access and mobility management function, a session management function, a network data analytics function, or any combination thereof.

In some examples of the method, apparatuses, and non-transitory computer-readable medium described herein, the request for information includes at least one of a UE identifier, a list of the one or more measurements, a data response configuration, a measurement period, a measurement interval, or any combination thereof.

A method for wireless communication at one or more network entities within a wireless communications network is described. The method may include receiving, from a UE, a request for information associated with one or more measurements associated with operation of the wireless communications network and transmitting, to the UE and in response to the request, the information associated with the one or more measurements, where the information is for performing a training or inference operation using a machine learning model at the UE.

An apparatus for wireless communication at one or more network entities within a wireless communications network is described. The apparatus may include a processor, memory coupled with the processor, and instructions stored in the memory. The instructions may be executable by the processor to cause the apparatus to receive, from a UE, a request for information associated with one or more measurements associated with operation of the wireless communications network and transmit, to the UE and in response to the request, the information associated with the one or more measurements, where the information is for performing a training or inference operation using a machine learning model at the UE.

Another apparatus for wireless communication at one or more network entities within a wireless communications network is described. The apparatus may include means for receiving, from a UE, a request for information associated with one or more measurements associated with operation of the wireless communications network and means for transmitting, to the UE and in response to the request, the information associated with the one or more measurements, where the information is for performing a training or inference operation using a machine learning model at the UE.

A non-transitory computer-readable medium storing code for wireless communication at one or more network entities within a wireless communications network is described. The code may include instructions executable by a processor to receive, from a UE, a request for information associated with one or more measurements associated with operation of the wireless communications network and transmit, to the UE and in response to the request, the information associated with the one or more measurements, where the information is for performing a training or inference operation using a machine learning model at the UE.

Some examples of the method, apparatuses, and non-transitory computer-readable medium described herein may further include operations, features, means, or instructions for receiving, from the UE, a network measurement configuration request indicating the one or more measurements and transmitting, to the UE, a network measurement configuration response indicating an acceptance to measure the one or more measurements, where receiving the request for information may be in response to the network measurement configuration response.

Some examples of the method, apparatuses, and non-transitory computer-readable medium described herein may further include operations, features, means, or instructions for receiving, from the UE, a network measurement configuration request indicating the one or more measurements and transmitting, to the UE, a network measurement configuration response indicating an acceptance to measure a subset of the one or more measurements, where receiving the request for information includes transmitting the request for information associated with the subset of the one or more measurements.

Some examples of the method, apparatuses, and non-transitory computer-readable medium described herein may further include operations, features, means, or instructions for receiving, from the UE, a request to subscribe to a network measurement configuration associated with the one or more measurements, where transmitting the information associated with the one or more measurements may be in response to the request to subscribe to the network measurement configuration.

Some examples of the method, apparatuses, and non-transitory computer-readable medium described herein may further include operations, features, means, or instructions for receiving, from the UE, a request to unsubscribe from a subset of the one or more measurements associated with the network measurement configuration.

In some examples of the method, apparatuses, and non-transitory computer-readable medium described herein, the network measurement configuration includes at least one of an indication of the one or more parameters, an indication of a periodic notification process, an indication of an event-triggered notification process, or any combination thereof.

In some examples of the method, apparatuses, and non-transitory computer-readable medium described herein, receiving a request for information may include operations, features, means, or instructions for receiving the request for information using a user plane connection via an Internet Protocol (IP) address of a network entity.

In some examples of the method, apparatuses, and non-transitory computer-readable medium described herein, receiving a request for information may include operations, features, means, or instructions for receiving the request for information using a control plane connection via a coordination entity associated with a network entity.

In some examples of the method, apparatuses, and non-transitory computer-readable medium described herein, receiving a request for information may include operations, features, means, or instructions for receiving the request for information using a service-based connection based on an application programming interface associated with a network entity.

Some examples of the method, apparatuses, and non-transitory computer-readable medium described herein may further include operations, features, means, or instructions for transmitting, to the UE, an indication to perform a handover operation from a first base station to a second base station and transmitting, to the second base station and in response to the hand-over operation, an indication of the request for information associated with the one or more measurements associated with operation of the wireless communications network.

In some examples of the method, apparatuses, and non-transitory computer-readable medium described herein, the one or more network entities include at least one of an analytics and data repository function, a centralized unit data repository function, a centralized unit of a base station, a distributed unit of a base station, an access and mobility management function, a session management function, a network data analytics function, or any combination thereof.

In some examples of the method, apparatuses, and non-transitory computer-readable medium described herein, the request for information includes at least one of a UE identifier, a list of the one or more measurements, a data response configuration, a measurement period, a measurement interval, or any combination thereof.

DETAILED DESCRIPTION

Figure 1:
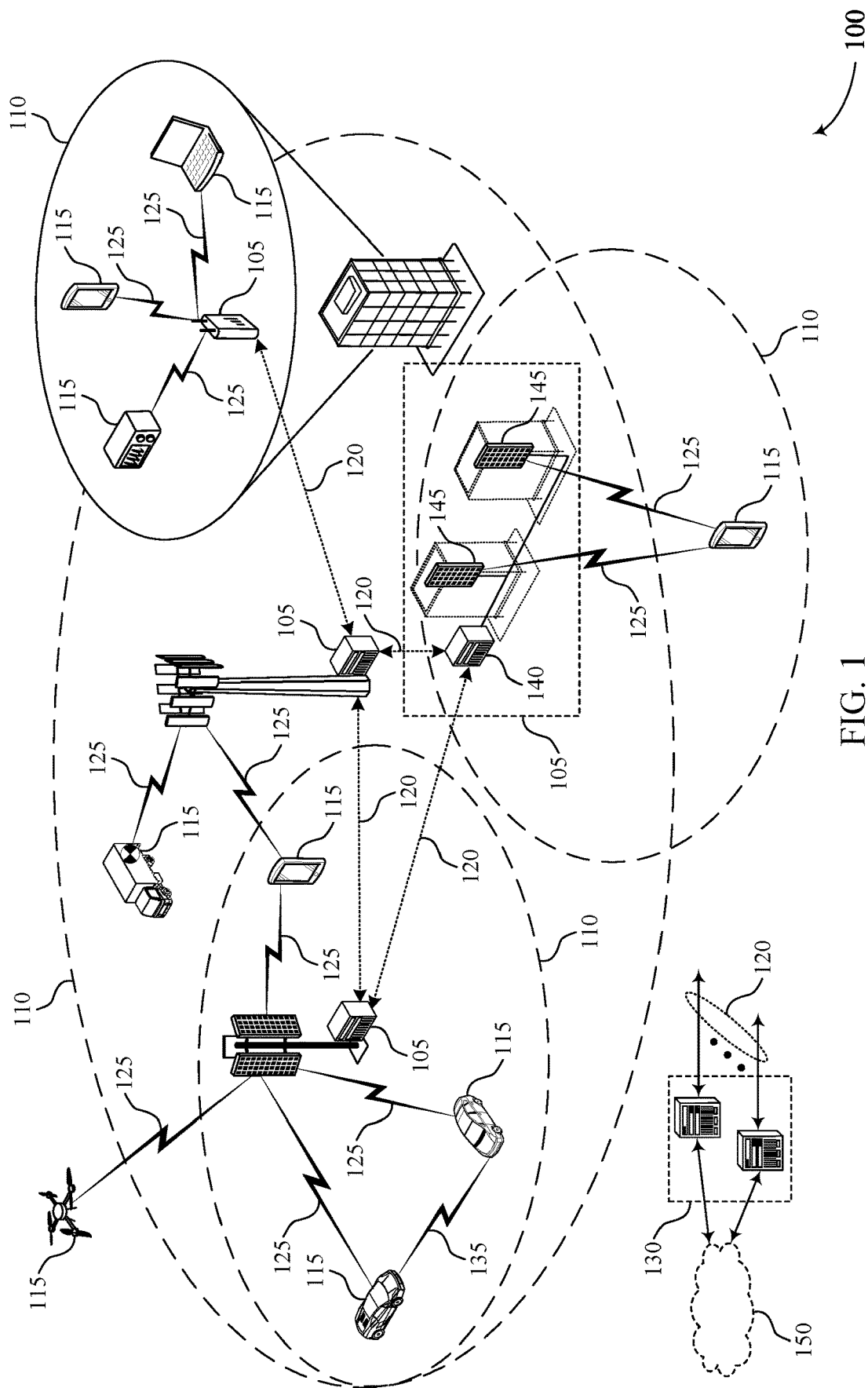
FIG. 1 illustrates an example of a wireless communications system that supports network measurements for enhanced machine learning model training and inference in accordance with aspects of the present disclosure.

In some wireless communication systems, a wireless communications network (may collect information to determine the network performance at various locations throughout the network coverage area. For example, the network (such as one or more network entities) may configure user equipments (UEs) operating in the network to report performance and location information to the network. The network may then use the reported information to train or develop machine learning models that may be used to enhance network performance (e.g., update one or more aspects of the network configuration in at least some locations, such as through adjusting one or more parameter values or other settings). In some cases, such techniques may be referred to as self-organizing network or minimization of drive testing (SON/MDT) mechanisms or techniques. In some instances, to support the SON/MDT mechanisms or other similar mechanisms, UEs may report confidential or higher layer data to a base station or other network entities.

One or more aspects of the present disclosure provide for mechanisms that enable a UE to collect information (e.g., data) from the network and then use the collected data to perform training of machine learning models developed locally on the UE, perform inference using such models, or both. For example, a UE may collect data from the network to train or develop machine learning models for enhancing UE performance (e.g., mobility enhancement or network load balance). In some instances, a UE may request data from one or more data repositories. For example, a UE may collect data from a fifth generation core (5GC) network repository (e.g., analytics and data repository function (ADRF)) or a next generation-radio access network (NG-RAN) repository (e.g., centralized unit data repository (CU-DR)). In some cases, data collected from the network repositories may be historical data that may be used at the UE for offline machine learning model training (e.g., machine learning model training performed prior to the UE being deployed). In some other instances, a UE may collect data directly from the network via network functions. For example, a UE may collect data from NG-RAN functions (e.g., CU and distributed unit (DU) functions or other functions associated with a base station) or core network functions (e.g., access and mobility management function (AMF), session management function (SMF), and user plane function (UPF)). A UE may additionally or alternatively collect data directly from a network data analytics function (NWDAF). In some instances, data collected directly from the network may not be real time data, and may be used for offline machine learning model training. In some other cases, data collected directly from the network may be real time data, and may be used for online machine learning model training (e.g., machine learning model training performed after the UE being deployed) as well as machine learning model inference.

Particular aspects of the subject matter described herein may be implemented to realize one or more advantages. The described techniques may support improvements in wireless communications systems by reducing signaling overhead. Further, in some examples, collecting data measured by the network, as described herein, may support higher data rates, thereby improving latency and reliability. As such, supported techniques may include improved network operations, and, in some examples, may promote network efficiencies, among other benefits.

FIG. 1 illustrates an example of a wireless communications system 100 that supports network measurements for enhanced machine learning model training and inference in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an AMF) and at least one user plane entity that routes packets or interconnects to external networks (e.g., a serving gateway (S-GW), a Packet Data Network (PDN) gateway (P-GW), or a UPF). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, the wireless communications system 100 may support one or more aspects of network measurements for enhanced machine learning model training and inference (e.g., machine learning model training and inference at a UE 115). For example, a UE 115 may transmit a request for information to a network entity and, in response to the request, the network entity may transmit the requested information to the UE. In some examples, the information request may be associated with one or more measurements associated with operations of the network (e.g., wireless communications system 100). In some instances, the UE 115 may train a machine learning model or perform an inference operation based on the information associated with the one or more measurements. In some examples, a network entity may be associated with an NG-RAN node (e.g., a base station 105) or a core network 130. In some cases, the core network 130 may be an example of a 5GC which may implement functions such as AMF, SMF, UPF, and the like. In such examples, the base station 105 may be an example of a gNB, or an ng-eNB which may implement functions such as CU and DU.

Figure 2:
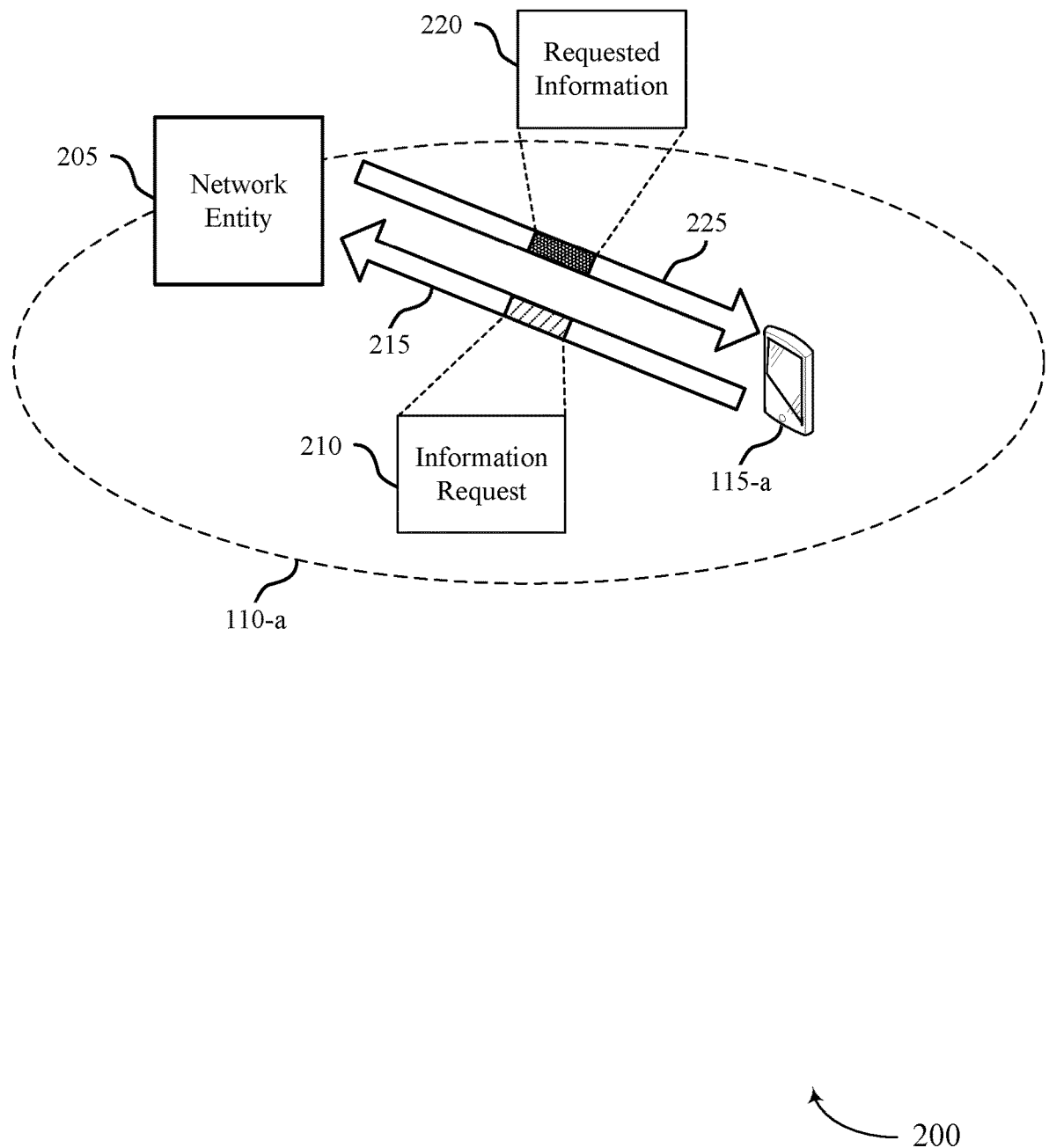
FIG. 2 illustrates an example of a wireless communications system that supports network measurements for enhanced machine learning model training and inference in accordance with aspects of the present disclosure.

FIG. 2 illustrates an example of a wireless communications system 200 that supports network measurements for enhanced machine learning model training and inference in accordance with aspects of the present disclosure. In some examples, the wireless communications system 200 may implement aspects of the wireless communications system 100. For instance, the wireless communications system 200 may include a UE 115-a which may be an example of a UE 115 described with reference to FIG. 1. Additionally, the wireless communications system 200 may include a network entity 205 which may be an example of a base station 105 or an entity of a core network 130 described with reference to FIG. 1. The UE 115-a and the network entity 205 may communicate within a geographic coverage area 110-a which may be an example of a geographic coverage area 110 described with reference to FIG. 1.

As depicted in the example of FIG. 2, the network entity 205 may transmit one or more downlink signals to the UE 115-a via a communications link 215 (e.g., a downlink communications link) and the UE 115-a may transmit one or more uplink signals to the network entity 205 via a communications link 215 (e.g., an uplink communications link). The wireless communications system 200 may include features for network-aided training of machine learning models at the UE 115-a, among other benefits.

Some wireless communications network may collect information to determine how the network is performing at various locations throughout the network coverage area (e.g., geographic coverage area 110-a). In some examples, a network operator may collect information related to the performance of the network via drive testing. However, in some cases, drive testing may be inefficient and costly. Therefore, in some other examples, a network entity may configure UEs operating in the network coverage area to report performance and location information to the network. In some cases, the UE 115-a may collect and report data to a network via a SON/MDT mechanism. In some instances of a SON/MDT mechanism, a UE may report collected data (e.g., reference signal received power (RSRP) measurements) to a network entity via an RRC message. In some other instances of a SON/MDT mechanism, a UE may report collected data to a network entity via non-access stratum (NAS) signaling. The network entity may then use the reported information to train or develop machine learning models that may be used to enhance network performance (e.g., update one or more aspects of the network configuration in at least some locations, such as through adjusting one or more parameter values or other settings). However, in some instances, a wireless communications system may not provide for a mechanism for network-aided training of machine learning models at the UE or for network-aided inference at the UE using the trained machine learning models.

Aspects of the present disclosure provide for one or more mechanisms that enable a UE to collect data from a network entity and then use the collected data to perform training and inference with machine learning models locally at the UE. Although a UE is referred to throughout the disclosure, it should be understood that the techniques described herein may also apply to UE vendors. For instance, the UE may collect data from the network entity and may then relay the collected data to a server (e.g., an application server) associated with the UE vendor. In such examples, the server associated with the UE vendor may collect data from the network to train or develop one or more machine learning models for enhancing performance at one or more UEs associated with the UE vendor. The UE vendor may train the machine learning model and may share the trained machine learning model with one or more UEs. In some examples, the UE vendor may configure or otherwise instruct a UE to collect the data from the network entities. Thus, a UE vendor may utilize data relayed by multiple UEs or otherwise collected from network entities to train machine learning model for performance enhancement of the UEs associated with the UE vendor.

As depicted in the example of FIG. 2, the wireless communications system 200 may support communications between the network entity 205 and the UE 115-a. In some examples, the UE 115-a may collect information (e.g., parameters, characteristics, measurements, statistics or any combination thereof) related to aspects of network performance (e.g., data such as downlink packet delay, uplink PDCP hole statistics, and the like) from the network entity 205. In some examples, the UE 115-a (or the server associated with the UE vendor) may collect data from the network to train or develop one or more machine learning models for enhancing performance at the UE 115-a (e.g., mobility optimization or network load balance). In some cases, data may be known to (i.e., measured by) the network entity 205, but may not be known to the UE 115-a. In such cases, the UE 115-a may transmit a request to collect the network-known data from the network entity 205. Stated alternatively, techniques described herein may provide for data, which may be known by the network entity 205, to be exposed to the UE 115-a. In some cases, the network-known data may be made readily available to a UE 115-a, for example by a data repository (e.g., the 5GC data repository, ADRF). In some cases, network-known data may enable efficient machine learning model training at the UE 115-a. Additionally or alternatively, correlations between UE-known data and network-known data may improve machine learning model training and inference at the UE 115-a. In some cases, a UE vendor or the UE 115-a may refrain from disclosing the machine learning model, confidential data, or higher layer (e.g., L4 through L7) data to the network entity 205. In addition, refraining from disclosing the machine learning model the network entity may help in UE vendor differentiation.

According to one or more aspects, the UE 115-a may transmit an information request 210 to the network entity 205 via the communication link 215. In some cases, the information request 210 may be associated with one or more measurements associated with operation of the wireless communications network. In response to the information request 210, the network entity 205 may transmit the requested information 220 to the UE 115-a via the communication link 225. In some examples, based on the requested information 220, the UE 115-*a* may perform a training of a machine learning model or an inference operation using the machine learning model. Additionally or alternatively, the UE 115-*a* may relay the requested information to a vendor associated with the UE 115-*a*. The vendor associated with the UE 115-*a* may then perform the training of the machine learning model or the inference operation using the machine learning model.

Figure 3:
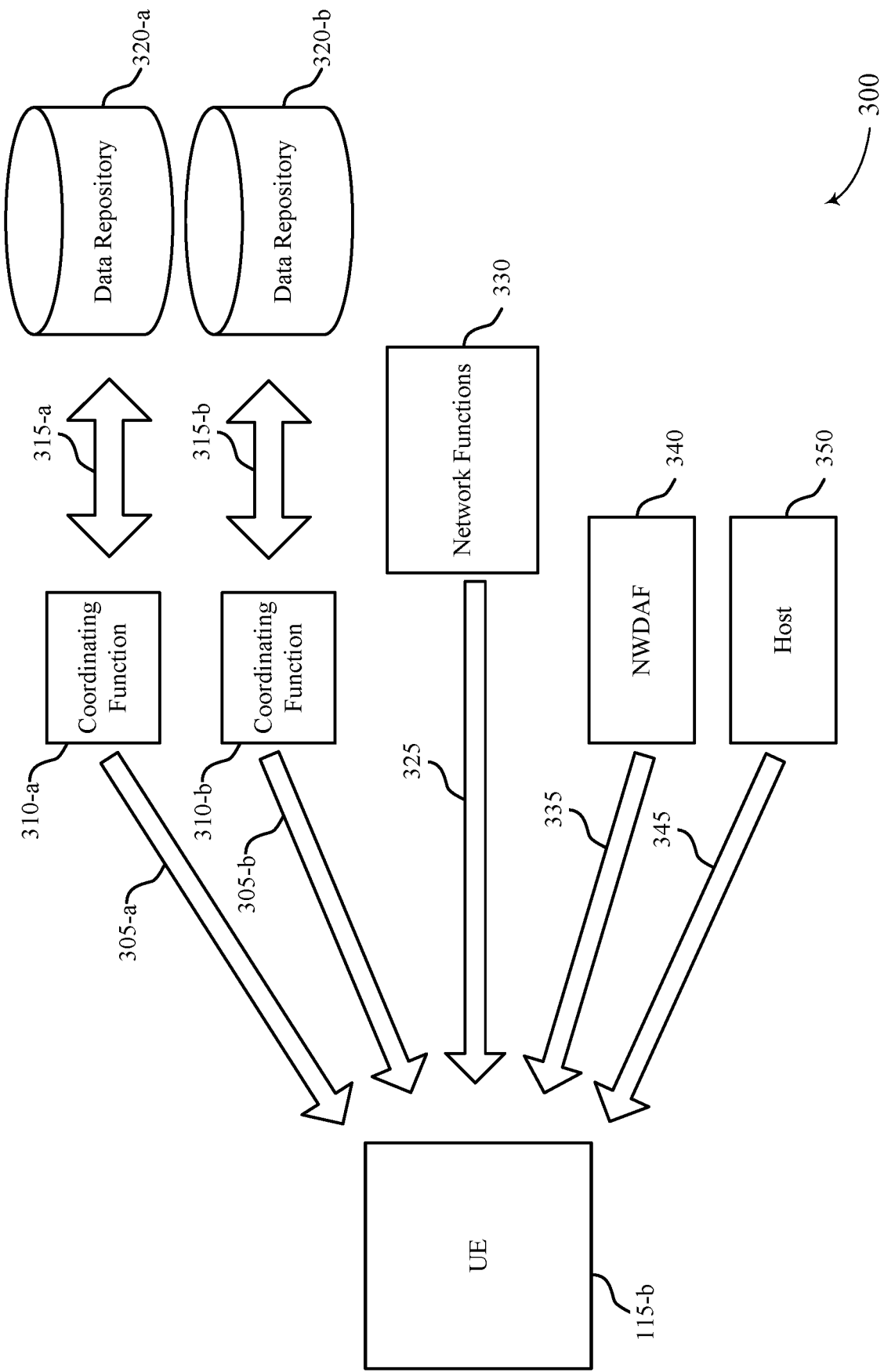
FIG. 3 describes a data collection procedure that supports network measurements for enhanced machine learning model training and inference in accordance with aspects of the present disclosure.

FIG. 3 describes a data collection procedure 300 that supports network measurements for enhanced machine learning model training and inference in accordance with aspects of the present disclosure. In some examples, the data collection procedure 300 may implement aspects of the wireless communications systems 100 and 200. For instance, the data collection procedure 300 may include a 115-*b* which may be an example of a UE 115 described with reference to FIG. 1. Additionally, the data collection procedure 300 may include data repositories 320 (e.g., data repository 320-*a* and data repository 320-*b*), network functions 330, an NWDAF 340, and a host 350, which may be examples of a network entity 205 described with reference to FIG. 2.

In some examples, a UE 115-*b* may collect data, such as analytics information, at the UE 115-*b* for machine learning model training. In some other examples, the UE 115-*b* may also collect data, such as network load information, from multiple different network entities. In one example, the UE 115-*b* may indirectly collect data from data repositories 320, for instance, via the coordinating functions 310. In some cases, a coordinating function 310 may be a logical entity separate from (i.e., not co-located with) the associated data repository 320. The coordinating function 310 may communicate with data repositories 320 via communication links 315. In some cases, the data repository 320-*a* may be an ADRF, and the data repository 320-*b* may be a CU-DR. In such cases, the coordinating function 310-*a* may be a data collection coordination function (DCCF), and the coordinating function 310-*b* may be a model and data access coordinator (MDAC). In some instances, an interface (e.g., a communication link 305) may be defined to enable communication between the UE 115-*b* and a coordinating function 310. In some cases, the communication links 305 may include a universal mobile telecommunications system (UMTS) air interface (e.g., a Uu interface) or a NAS. In another example, the UE 115-*b* may collect data (e.g., network measurements) directly from the network functions 330 via a communication link 325. In some cases, the network functions may include CU, DU, UPF, AMF, and SMF. Data collected from data repositories 320 and the network functions 330 may be used for offline machine learning model training. In yet another example, the UE 115-*b* may collect data or analytics directly from intelligent network entities such as an NWDAF 340. In such an example, the UE 115-*b* may communicate with the NWDAF 340 via communication link 335. The UE 115-*b* may also collect data directly from training or interference hosts (e.g., the host 350) within the network. In such an example, the UE 115-*b* may communicate with a host 350 via the communication link 345. In some instances, data collected directly from the network may be used for online machine learning model training and inference. In some cases, a mechanism may be defined to configure and collect network measurement from the described network entities (e.g., the data repositories 320, the network functions 330, the NWDAF 340, and the host 350). Additionally, in some cases, a data format may be defined for inter-operability and for efficient data collection from the network entities by the UE 115-*b*. According to aspects depicted herein, the communications between a UE 115-*b* and a network entity may be transmitted via RRC messages. Although depicted herein as being performed by a UE, it may be understood that the data collection procedure 300 may be performed by a UE vendor.

Figure 4A:
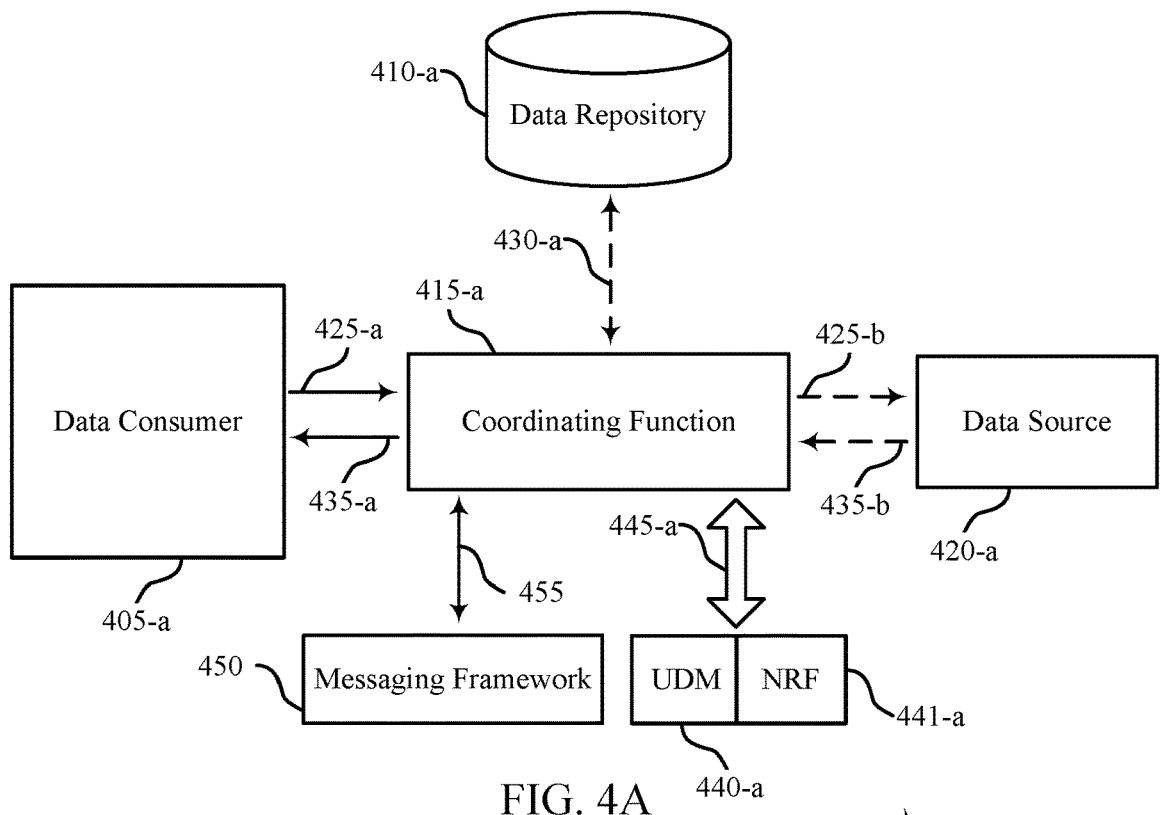
FIGS. 4A & 4B describe data collection procedures in a system that supports network measurements for enhanced machine learning model training and inference in accordance with aspects of the present disclosure.
Figure 4B:
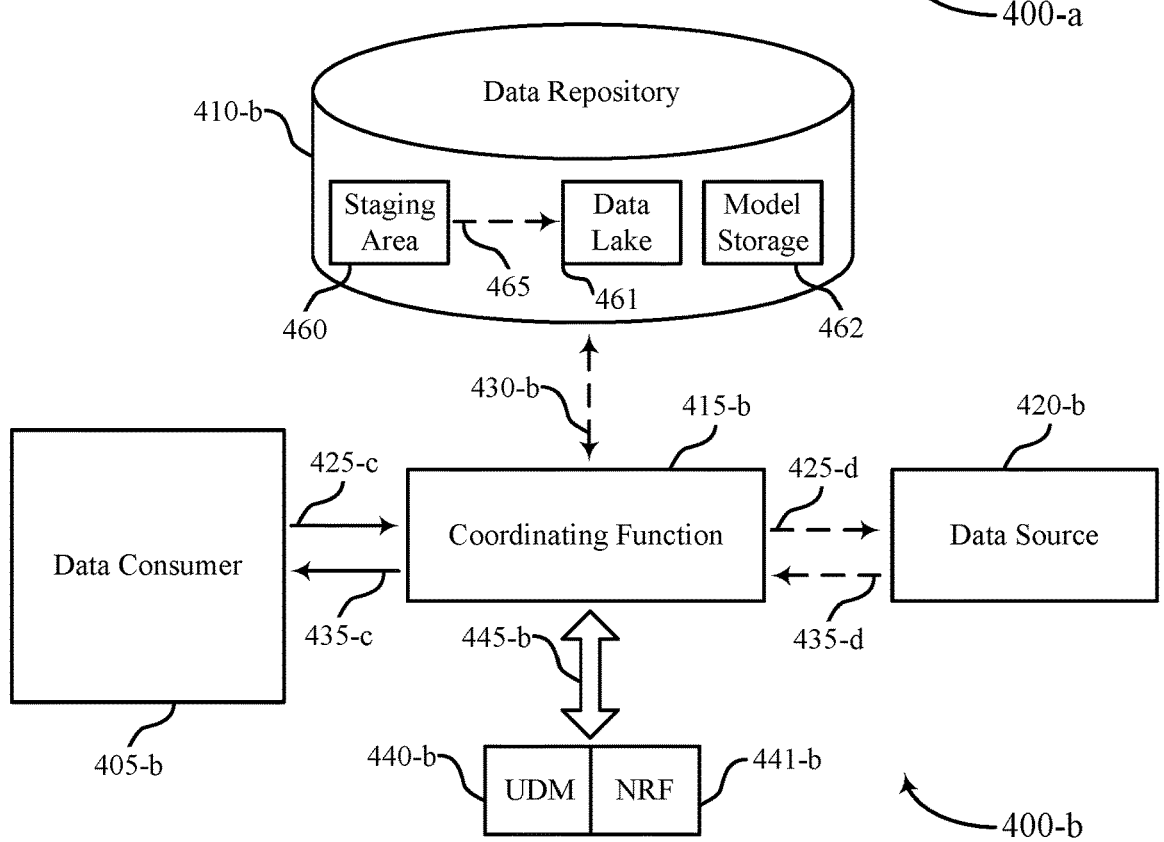

FIGS. 4A and 4B describe data collection procedures 400 in a system that supports network measurements for enhanced machine learning model training and inference in accordance with aspects of the present disclosure. In some examples, the data collection procedures 400 may implement aspects of the wireless communications systems 100 and wireless communications system 200, as depicted with reference to FIGS. 1 and 2. As depicted in the example of FIGS. 4A and 4B, the data collection procedures 400 (e.g., 400-*a* and 400-*b*) may include one or more data consumers 405 (data consumer 405-*a* and data consumer 405-*b*), which may be examples of a UE 115 described with reference to FIG. 1, a NWDAF 340 described with reference to FIG. 3, or a network function 330 described with reference to FIG. 3. Additionally, the data collection procedures 400 may include the data repositories 410 (data repository 410-*a* and data repository 410-*b*) and the coordinating functions 415 (coordinating function 415-*a* and coordinating function 415-*b*), which may be examples of the corresponding devices as described with reference to FIG. 3.

A data consumer 405 may include a UE and a NWDAF. In some cases, the data consumer 405-*a* may include an analytics logical function and a model training logical function. Additionally or alternatively, the data consumer 405-*b* may include a model training host and a model interference host. The data consumer 405 may collect data from the data repositories 410. The data repositories 410 may be coordinated via the coordinating functions 415. In such examples, a data consumer 405 may collect data from the data repositories 410 via the coordinating functions 415. A data repository 410 may, in some cases, be populated with data over a time period (e.g., the data may be historic). In some instances, the data repository 410 may be populated by a data source 420 (data source 420-*a* and data source 420-*b*). In some cases, the historic data stored in the data repositories 410 may be readily available to the data consumer 405 to use for offline training. For example, the data consumer 405 may transmit (e.g., via an interface 425) a data request to a coordinating function 415. In some cases, in response to the data request, the coordinating function 415 may retrieve (e.g., via an interface 430) the request data from the data repository 410. In some other cases, the coordinating function 415 may retrieve (e.g., via an interface 445) data from virtualized network functions (e.g., a unified data management (UDM) 440 or a network repository function (NRF) 441). The coordinating function 415 may then transmit a response including the request data (e.g., or analytics) to the data consumer 405. Stated alternatively, the data consumer 405 may then collect the request data from the coordinating function 415 via the interface 435. Additionally or alternatively, the data consumer 405 may transmit (e.g., via an interface 425) a data request directly to a data source 420 and, in response, collected the requested data via an interface 435. In some cases, the data request may indicate an ID associated with the data consumer 405, a list of requested data, and a data response configuration (e.g., information indicating whether the request is periodic or event based). The data response transmitted by the coordinating function 415 may, in some cases, include the requested data.

In some examples, the data consumer 405 may collect data from the data repositories 410 via multiple signaling mechanisms. In a first example, the data consumer 405 may collect data from the data repository 410 using a user plane connection. For example, the data consumer 405 may collect data via the IP address of the data repository 410. In such an example, the interface may be a 5G air interface or a Uu interface. In another example, the data consumer 405 may collect data using a service-based architecture. For instance, the data consumer 405 may collect data using application program interfaces (APIs). In some cases, the API may be known to both the data consumer 405 and the data repository 410. In some instances, the service-based communication may be based on known APIs (e.g., a RESTFUL protocol or a REST protocol). In some other instances, the service-based communication may be implementation based. In a second case, the data consumer 405 may collect data from the data repositories 410 using control plane connections. For example, the data consumer 405 may collect data from the data repository 410 via a coordination entity (e.g., a coordination function 415).

As depicted in the example of FIG. 4A, the data repository 410-a may be a core network data repository (e.g., an ADRF) and the coordinating function 415-a may be a DCCF. In such an example, the data consumer 405-a may communicate with the coordinating function 415-a via a CU-control plane (CU-CP). Additionally, in some cases, the data consumer 405-a may also request data from a messaging framework 450. For example, the data consumer 405-a may transmit (e.g., via an interface 425-a) a data request to the coordinating function 415-a and, in response, the coordinating function 415-a may retrieve (e.g., via an interface 455) data from the messaging framework 450. The data consumer 405-a may then collect the requested data via an interface 435-a. As depicted in the example of FIG. 4B, the data repository 410-b may be an NG-RAN data repository (e.g., a CU-DR) and the coordinating function 415-b may be an MDAC. In such an example, the data consumer 405-b may communicate with the coordinating function 415-b via an AMF. Additionally, in some cases, the data repository 410-b may include a staging area 460, a data lake 461, and a model storage 462. In some cases, the model storage 462 may be used for machine learning model storage and aggregation. The staging area 460 may, in some cases, act as an intermediate storage area for data processing. In some cases, data may be transferred (e.g., via an interface 465) between the staging area 460 and the data lake 461. The data lake 461 may be a centralized repository for storing data.

Figure 5:
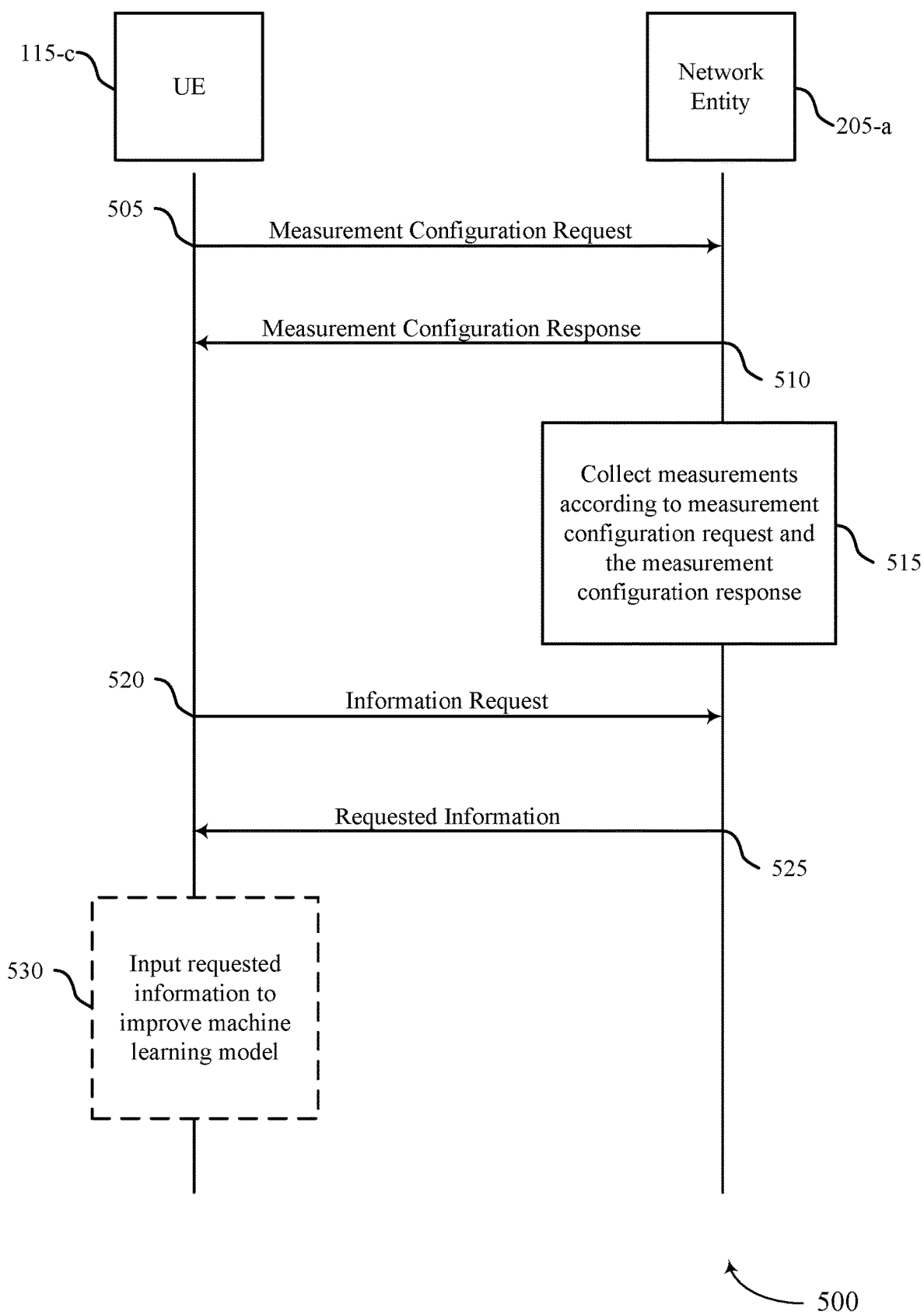
FIG. 5 illustrates an example of a process flow in a system that supports network measurements for enhanced machine learning model training and inference in accordance with aspects of the present disclosure.

FIG. 5 illustrates an example of a process flow 500 in a system that supports network measurements for enhanced machine learning model training and inference in accordance with aspects of the present disclosure. In some examples, the process flow 500 may implement aspects of the wireless communications system 100. For instance, the process flow 500 may include a UE 115-c which may be an example of a UE 115 described with reference to FIG. 1. Additionally, the process flow 500 may include a network entity 205-a which may be an example of a base station 105 or an entity of a core network 130 described with reference to FIG. 1.

The process flow 500 may be implemented by the UE 115-c, the network entity 205-a, or both. In the following description of the process flow 500, the information communicated between the UE 115-c and the network entity 205-a may be performed in different orders or at different times. Some operations may also be omitted from the process flow 500, and other operations may be added to the process flow 500.

At 505, the UE 115-c may transmit a measurement configuration request to the network entity 205-a. The measurement configuration request may indicate parameters to be measured by the network entity 205-a, the measurement period, and the measurement interval.

At 510, the network entity 205-a may transmit a measurement configuration response. The measurement configuration response may indicate the parameters the network entity 205-a determined to measure, and may also indicate parameter measurements that may not be supported by the network entity 205-a.

At 515, the network entity 205-a may collect measurements according to the measurement configuration request transmitted by the UE 115-c at 505 and the measurement configuration response transmitted by the network entity 205-a at 510.

At 520, the UE 115-c may transmit an information request to the network entity 205-a. The information request may indicate whether the network entity 205-a may transmit a set or a subset of the measurements collected by the network entity 205-a.

At 525, the network entity 205-a may transmit the requested information. In some instances, the UE 115-c may change locations (i.e., the UE 115-c may be mobile) and, accordingly, the network entity 205-a (e.g., a network entity associated with an NG-RAN node) may perform a handover procedure to handover the UE 115-c to another (e.g., a target) network entity 205. In such cases, the network configuration request may be propagated to the target network entity 205 during the handover procedure.

At 530, the UE 115-c may alternatively input the requested information, from the network entity 205-a, to improve a machine learning model at the UE 115-c.

Figure 6:
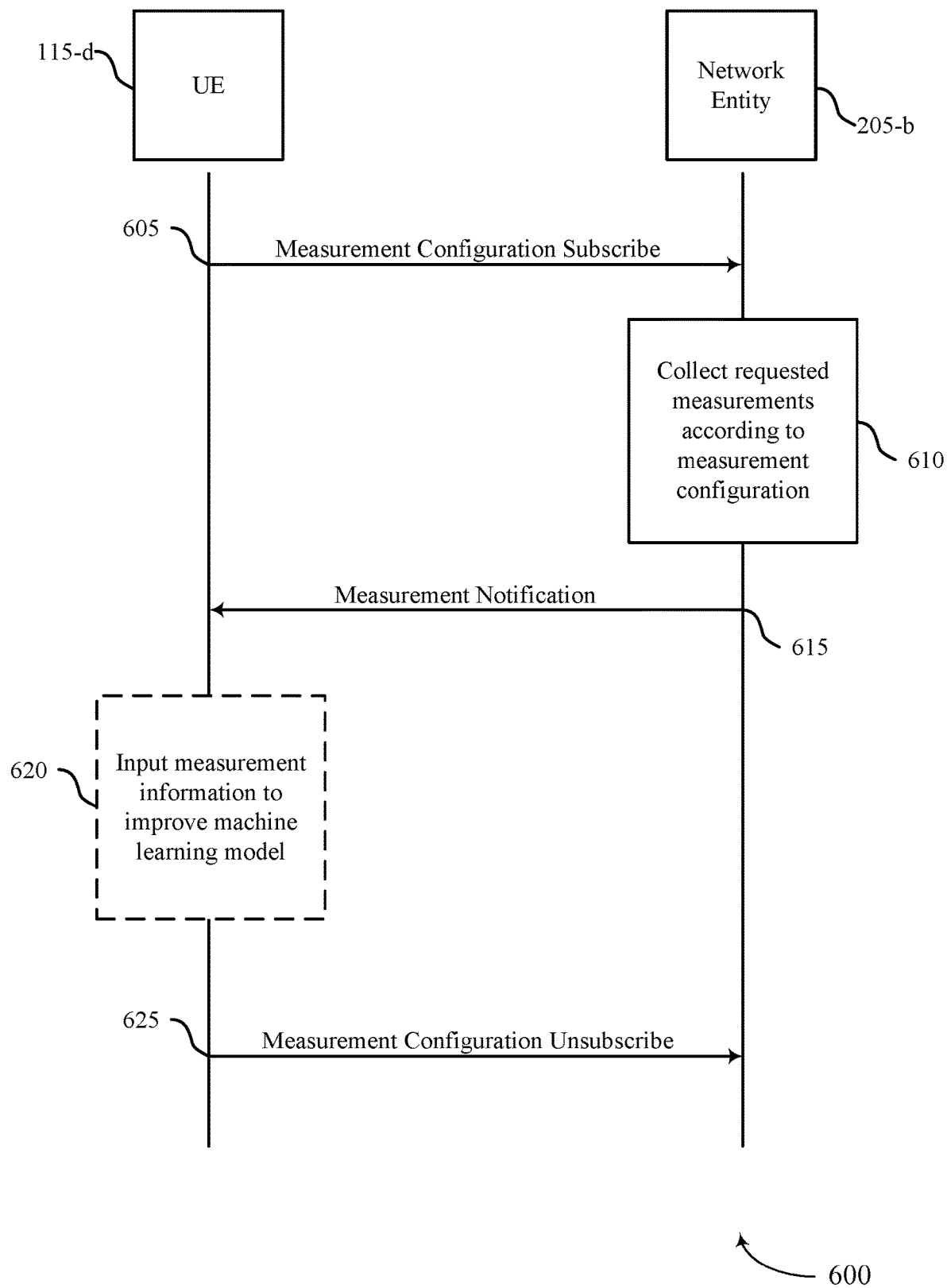
FIG. 6 illustrates an example of a process flow in a system that supports network measurements for enhanced machine learning model training and inference in accordance with aspects of the present disclosure.

FIG. 6 illustrates an example of a process flow 600 in a system that supports network measurements for enhanced machine learning model training and inference in accordance with aspects of the present disclosure. In some examples, the process flow 600 may implement aspects of the wireless communications system 100. For instance, the process flow 600 may include a UE 115-d which may be an example of a UE 115 described with reference to FIG. 1. Additionally, the process flow 600 may include a network entity 205-b which may be an example of a base station 105 or an entity of a core network 130 described with reference to FIG. 1.

The process flow 600 may be implemented by the UE 115-d, the network entity 205-b, or both. In the following description of the process flow 600, the information communicated between the UE 115-d and the network entity 205-b may be performed in different orders or at different times. Some operations may also be omitted from the process flow 600, and other operations may be added to the process flow 600.

In some examples, the network entity 205-b may be configured to support measurements that the UE 115-d may use for online machine learning model training and inference. For example, at 605 the UE 115-d may transmit a measurement configuration subscribe message to the network entity 205-b. The measurement configuration subscribe message may indicate parameters to be measured by the network entity 205-b, one or more methods for measurement notification, and whether measurements may be performed periodically or whether measurements may be triggered by an event.

At 610, the network entity 205-b may collect request measurements according to the measurement configuration. The measurement configuration may configure the network entity 205-b to autonomously notify the UE 115-d.

At 615, the network entity 205-b may transmit a measurement notification to the UE 115-d.

At 620, the UE 115-d may alternatively input measurement information, from the network entity 205-b, to improve a machine learning model at the UE 115-d.

As one example, the UE 115-d in conjunction with the network entity 205-b may perform a machine learning based downlink throughput prediction in accordance with aspects of the process flow 600 for streaming video rate adaptation and transmission control protocol congestion control. In such an example, the throughput estimation may be impacted by parameters which are unknown to the UE 115-d, such as a percentage of spare physical resource blocks (e.g., an average of physical resource blocks that are not used to carry uplink or downlink signaling as observed over some time period), or downlink queue length (e.g., a quantity of downlink messages or amount of downlink data for which transmission is pending), or downlink delay information (e.g., a latency associated with downlink transmissions, such as an average latency from when a downlink data packet is received at a gNB to when it is transmitted by the gNB). In some examples, the UE 115-d may subscribe to receive such information at 605, and the network entity 205-b may transmit such information to the UE 115-d at 615, such that the UE 115-d can use this additional information to train the machine learning model. For example, the UE 115-d may use the network load information, the downlink queue length, the downlink delay information, or any combination thereof as additional inputs to improve the machine learning model at the UE 115-d. In some instances, improvements to the machine learning model at the UE 115-d may provide improved load predictions and, accordingly, improved throughput predictions.

At 625, the UE 115-d may transmit a measurement configuration unsubscribe message to the network entity 205-b. In some cases, the measurement configuration unsubscribe message may indicate parameters that the network entity 205-b may refrain from (i.e., stop) measuring the parameters.

Figure 7A:
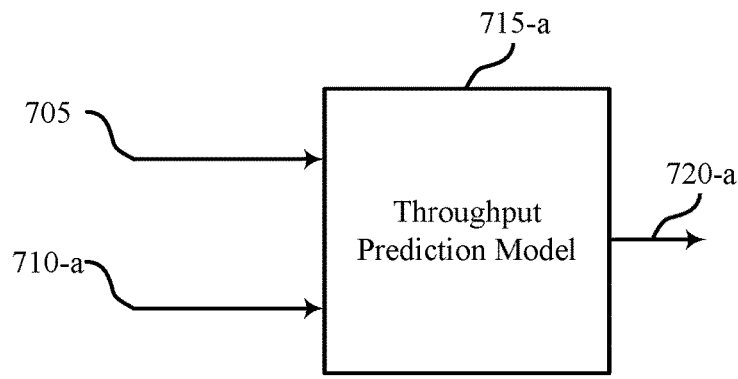
FIGS. 7A & 7B describe data collection procedures in a system that supports network measurements for enhanced machine learning model training and inference in accordance with aspects of the present disclosure.
Figure 7B:
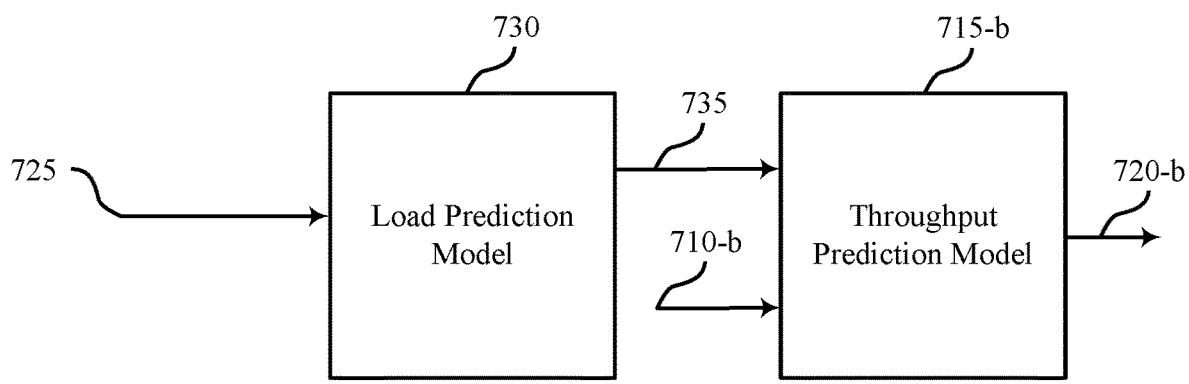

FIGS. 7A and 7B describe data collection procedures 700 in a system that supports network measurements for enhanced machine learning model training and inference in accordance with aspects of the present disclosure. The operations described in the data collection procedures 700 may be implemented by a UE 115 or its components as described herein.

As depicted in the example of FIG. 7A, the UE 115 may collect data from the network to be used for machine learning model training and inference. For example, the UE 115 may input network provided load measurements 705 into a machine learning model for throughput predictions (e.g., the throughput prediction model 715-a). Additionally, the UE 115 may also input the UE known parameters for throughput predictions 710-a into the throughput prediction model 715-a. The throughput prediction model 715-a may then perform a machine learning operation based on the network provided load measurements 705 and the UE-known parameters for throughput predictions 710-a. The throughout prediction model 715-a may then output improved throughput predictions 720-a. In such an example, the throughput prediction model 715-a may utilize dynamic (i.e., real time) collection of network load measurements.

In some other examples, as depicted in the example of FIG. 7B, a UE 115 may use network provided load measurements (e.g., network provided load measurements 705 described with respect to FIG. 7A) as a ground truth for training machine learning models. For example, a UE 115 may use network provided load measurements (not shown) as a ground truth, and may input the UE known parameters for load prediction 725 into a machine learning model for load predictions (e.g., a load prediction model 730). The load prediction model 730 may then perform a machine learning operation based on the UE known parameters for load prediction 725 and output network load predictions 735. A UE 115 may then input the network load predictions 735 into a machine learning model for throughput predictions (e.g., the throughput prediction model 715-b). The UE 115 may also input the UE known parameters for throughput predictions 710-b into the throughput prediction model 715-b. The throughput prediction model 715-b may then perform a machine learning operation based on the network load predictions 735 and the UE known parameters for throughput predictions 710-b. The throughput prediction model 715-b may then output improved throughput predictions 720-b.

Figure 8:
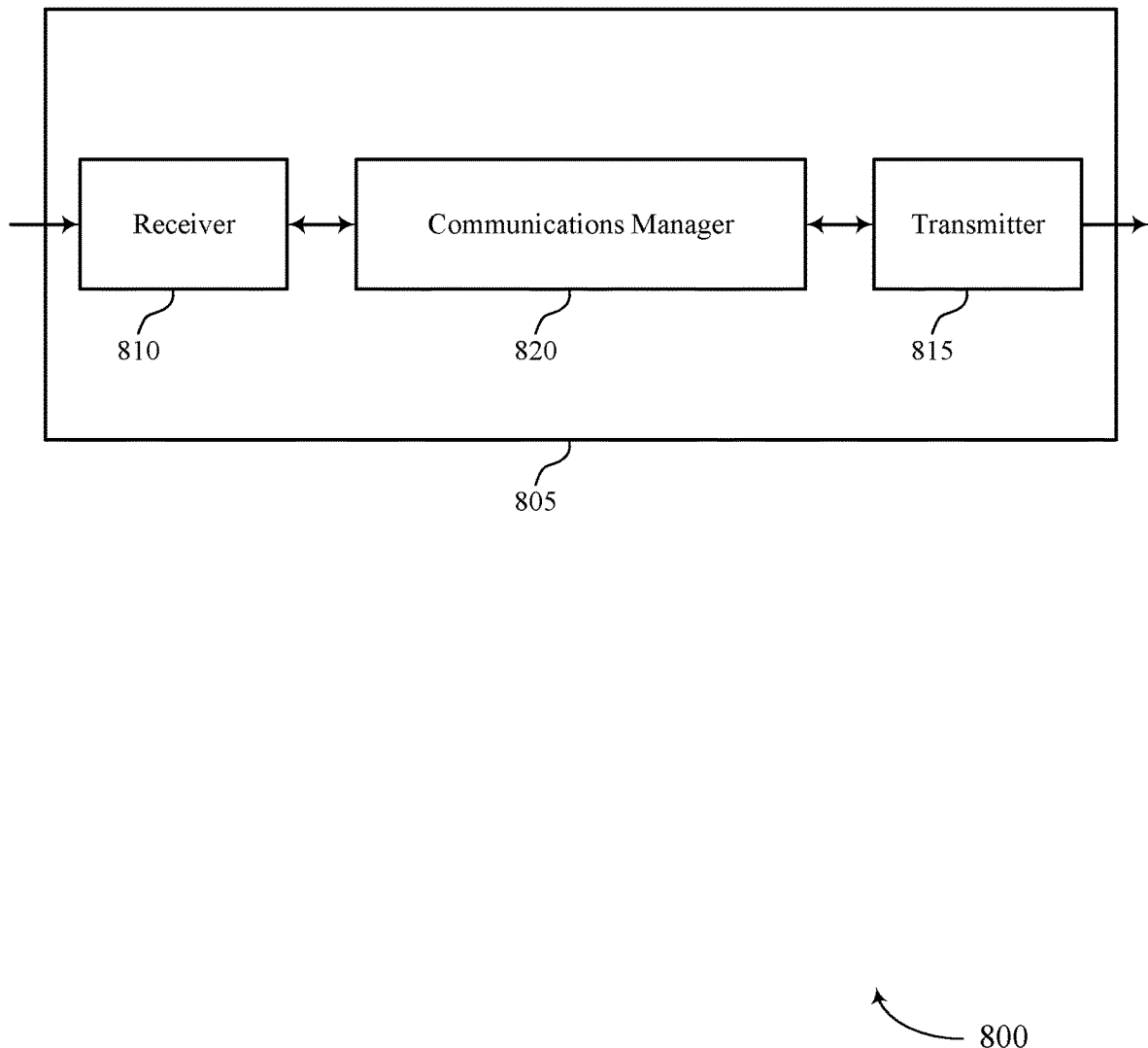
FIGS. 8 and 9 show block diagrams of devices that support network measurements for enhanced machine learning model training and inference in accordance with aspects of the present disclosure.

FIG. 8 shows a block diagram 800 of a device 805 that supports network measurements for enhanced machine learning model training and inference in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to network measurements for enhanced machine learning model training and inference). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to network measurements for enhanced machine learning model training and inference). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of network measurements for enhanced machine learning model training and inference as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for transmitting, to a network entity within a wireless communications network, a request for information associated with one or more measurements associated with operation of the wireless communications network. The communications manager 820 may be configured as or otherwise support a means for receiving, from the network entity and in response to the request, the information associated with the one or more measurements. The communications manager 820 may be configured as or otherwise support a means for performing a training or inference operation using a machine learning model at the UE, the training or inference operation based on the information associated with the one or more measurements.

By including or configuring the communications manager 820 in accordance with examples as described herein, the device 805 (e.g., a processor controlling or otherwise coupled to the receiver 810, the transmitter 815, the communications manager 820, or any combination thereof) may support techniques for more efficient utilization of communication resources.

Figure 9:
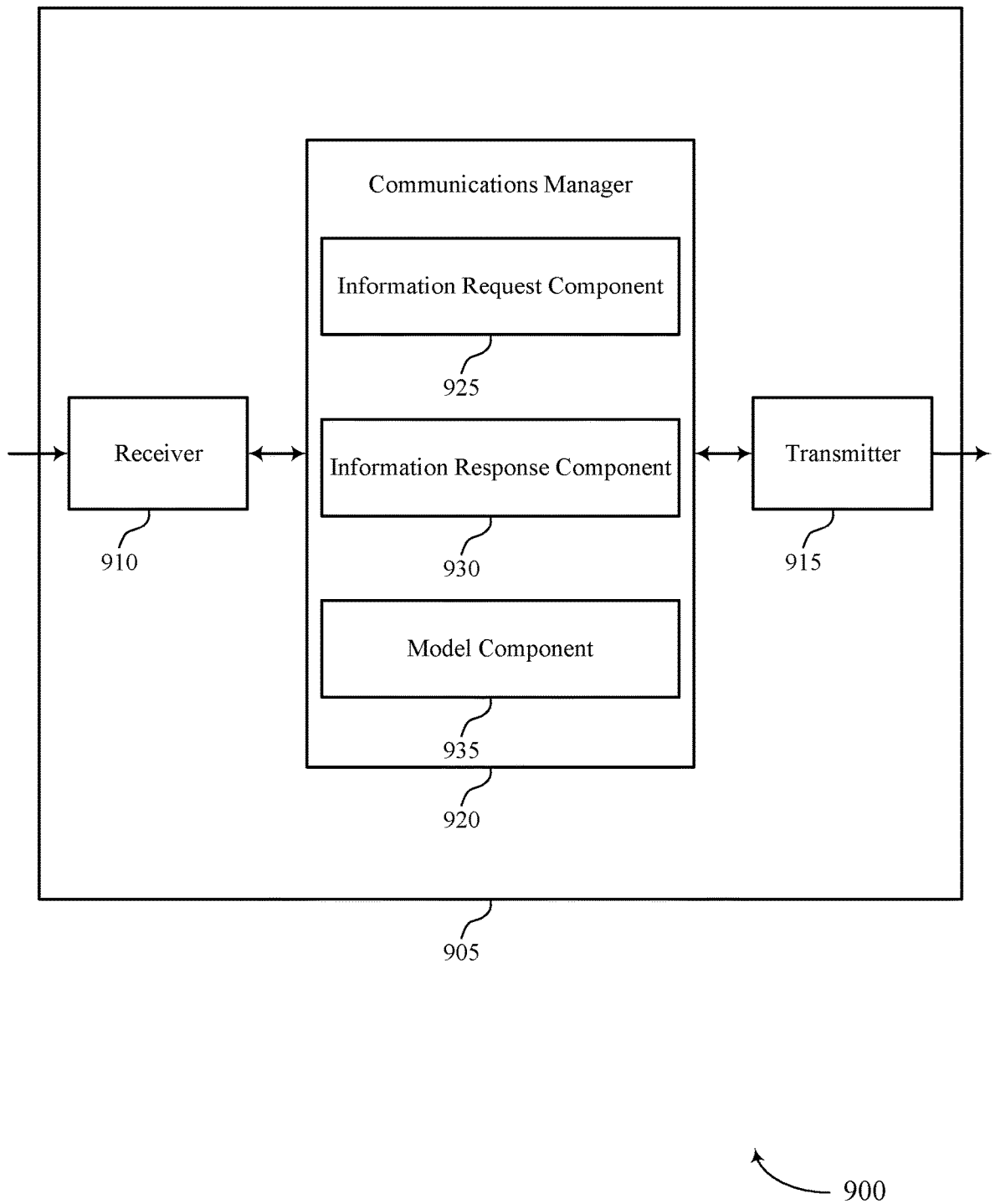

FIG. 9 shows a block diagram 900 of a device 905 that supports network measurements for enhanced machine learning model training and inference in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to network measurements for enhanced machine learning model training and inference). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to network measurements for enhanced machine learning model training and inference). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of network measurements for enhanced machine learning model training and inference as described herein. For example, the communications manager 920 may include an information request component 925, an information response component 930, a model component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The information request component 925 may be configured as or otherwise support a means for transmitting, to a network entity within a wireless communications network, a request for information associated with one or more measurements associated with operation of the wireless communications network. The information response component 930 may be configured as or otherwise support a means for receiving, from the network entity and in response to the request, the information associated with the one or more measurements. The model component 935 may be configured as or otherwise support a means for performing a training or inference operation using a machine learning model at the UE, the training or inference operation based on the information associated with the one or more measurements.

Figure 10:
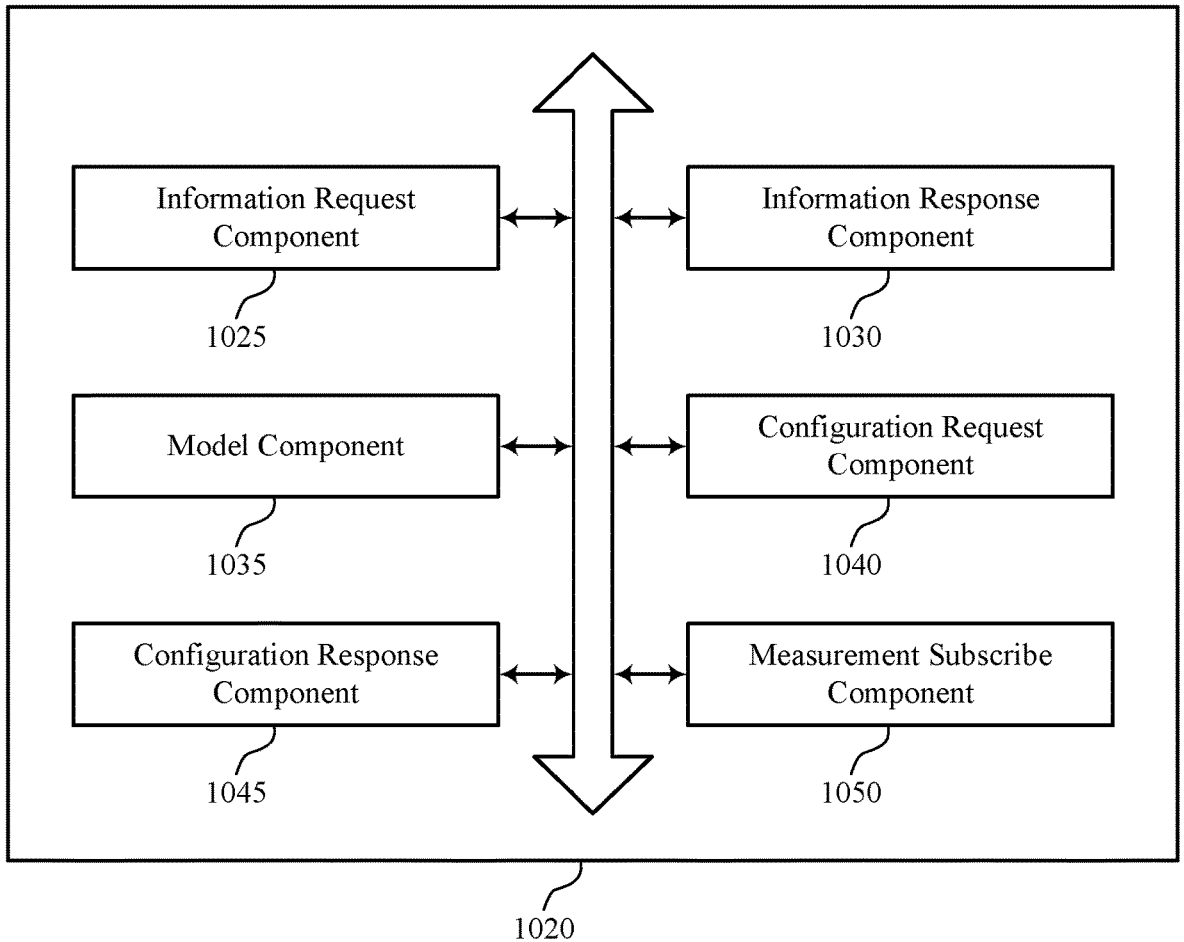
FIG. 10 shows a block diagram of a communications manager that supports network measurements for enhanced machine learning model training and inference in accordance with aspects of the present disclosure.

FIG. 10 shows a block diagram 1000 of a communications manager 1020 that supports network measurements for enhanced machine learning model training and inference in accordance with aspects of the present disclosure. The communications manager 1020 may be an example of aspects of a communications manager 820, a communications manager 920, or both, as described herein. The communications manager 1020, or various components thereof, may be an example of means for performing various aspects of network measurements for enhanced machine learning model training and inference as described herein. For example, the communications manager 1020 may include an information request component 1025, an information response component 1030, a model component 1035, a configuration request component 1040, a configuration response component 1045, a measurement subscribe component 1050, or any combination thereof. Each of these components may communicate, directly or indirectly, with one another (e.g., via one or more buses).

The communications manager 1020 may support wireless communication at a UE in accordance with examples as disclosed herein. The information request component 1025 may be configured as or otherwise support a means for transmitting, to a network entity within a wireless communications network, a request for information associated with one or more measurements associated with operation of the wireless communications network. The information response component 1030 may be configured as or otherwise support a means for receiving, from the network entity and in response to the request, the information associated with the one or more measurements. The model component 1035 may be configured as or otherwise support a means for performing a training or inference operation using a machine learning model at the UE, the training or inference operation based on the information associated with the one or more measurements.

In some examples, the configuration request component 1040 may be configured as or otherwise support a means for transmitting, to the network entity, a network measurement configuration request indicating the one or more measurements. In some examples, the configuration response component 1045 may be configured as or otherwise support a means for receiving, from the network entity, a network measurement configuration response indicating an acceptance to measure the one or more measurements, where transmitting the request for information is in response to the network measurement configuration response.

In some examples, the configuration request component 1040 may be configured as or otherwise support a means for transmitting, to the network entity, a network measurement configuration request indicating the one or more measurements. In some examples, the configuration response component 1045 may be configured as or otherwise support a means for receiving, from the network entity, a network measurement configuration response indicating an acceptance to measure a subset of the one or more measurements, where transmitting the request for information includes transmitting the request for information associated with the subset of the one or more measurements.

In some examples, the measurement subscribe component 1050 may be configured as or otherwise support a means for transmitting, to the network entity, a request to subscribe to a network measurement configuration associated with the one or more measurements, where receiving the information associated with the one or more measurements is in response to the request to subscribe to the network measurement configuration.

In some examples, the measurement subscribe component 1050 may be configured as or otherwise support a means for transmitting, to the network entity, a request to unsubscribe from a subset of the one or more measurements associated with the network measurement configuration. In some examples, the network measurement configuration includes at least one of an indication of one or more parameters, an indication of a periodic notification process, an indication of an event-triggered notification process, or any combination thereof.

In some examples, to support transmitting a request for information, the information request component 1025 may be configured as or otherwise support a means for transmitting the request for information using a user plane connection via an IP address of the network entity. In some examples, to support transmitting a request for information, the information request component 1025 may be configured as or otherwise support a means for transmitting the request for information using a control plane connection via a coordination entity associated with the network entity.

In some examples, to support transmitting a request for information, the information request component 1025 may be configured as or otherwise support a means for transmitting the request for information using a service-based connection based on an application programming interface associated with the network entity. In some examples, the model component 1035 may be configured as or otherwise support a means for predicting a throughput value, a network load value, a downlink queue length, a downlink delay value, or any combination thereof based on performing the training or inference operation.

In some examples, the network entity includes at least one of an ADRF, a CU-DR function, a CU of a base station, a DU of a base station, an AMF, an SMF, an NWDAF, or any combination thereof. In some examples, the request for information includes at least one of a UE identifier, a list of the one or more measurements, a data response configuration, a measurement period, a measurement interval, or any combination thereof.

Figure 11:
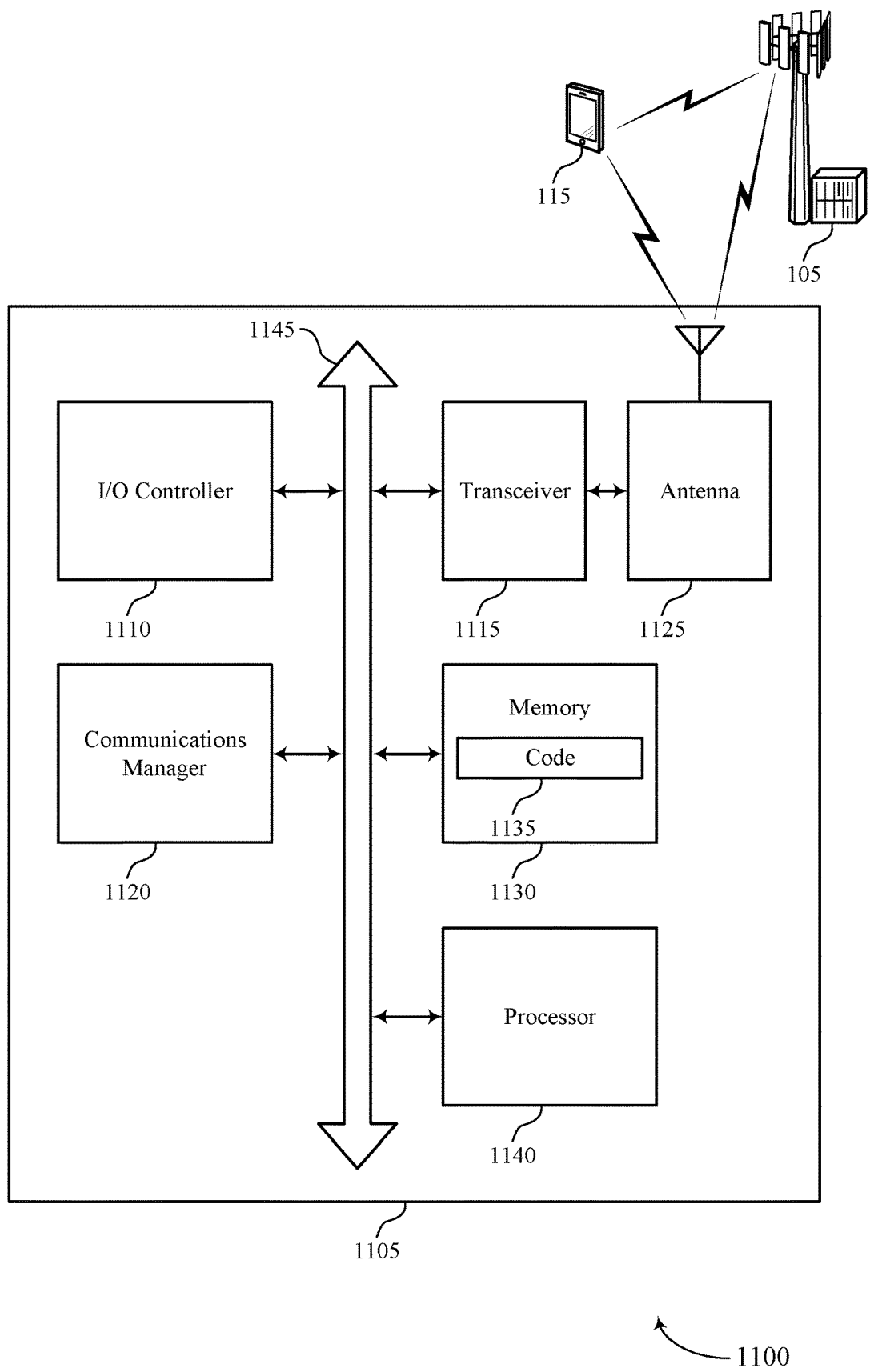
FIG. 11 shows a diagram of a system including a device that supports network measurements for enhanced machine learning model training and inference in accordance with aspects of the present disclosure.

FIG. 11 shows a diagram of a system 1100 including a device 1105 that supports network measurements for enhanced machine learning model training and inference in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting network measurements for enhanced machine learning model training and inference). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for transmitting, to a network entity within a wireless communications network, a request for information associated with one or more measurements associated with operation of the wireless communications network. The communications manager 1120 may be configured as or otherwise support a means for receiving, from the network entity and in response to the request, the information associated with the one or more measurements. The communications manager 1120 may be configured as or otherwise support a means for performing a training or inference operation using a machine learning model at the UE, the training or inference operation based on the information associated with the one or more measurements.

By including or configuring the communications manager 1120 in accordance with examples as described herein, the device 1105 may support techniques for improved communication reliability, improved user experience related to reduced processing, more efficient utilization of communication resources, improved coordination between devices, improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of network measurements for enhanced machine learning model training and inference as described herein, or the processor 1140 and the memory 1130 may be otherwise configured to perform or support such operations.

Figure 12:
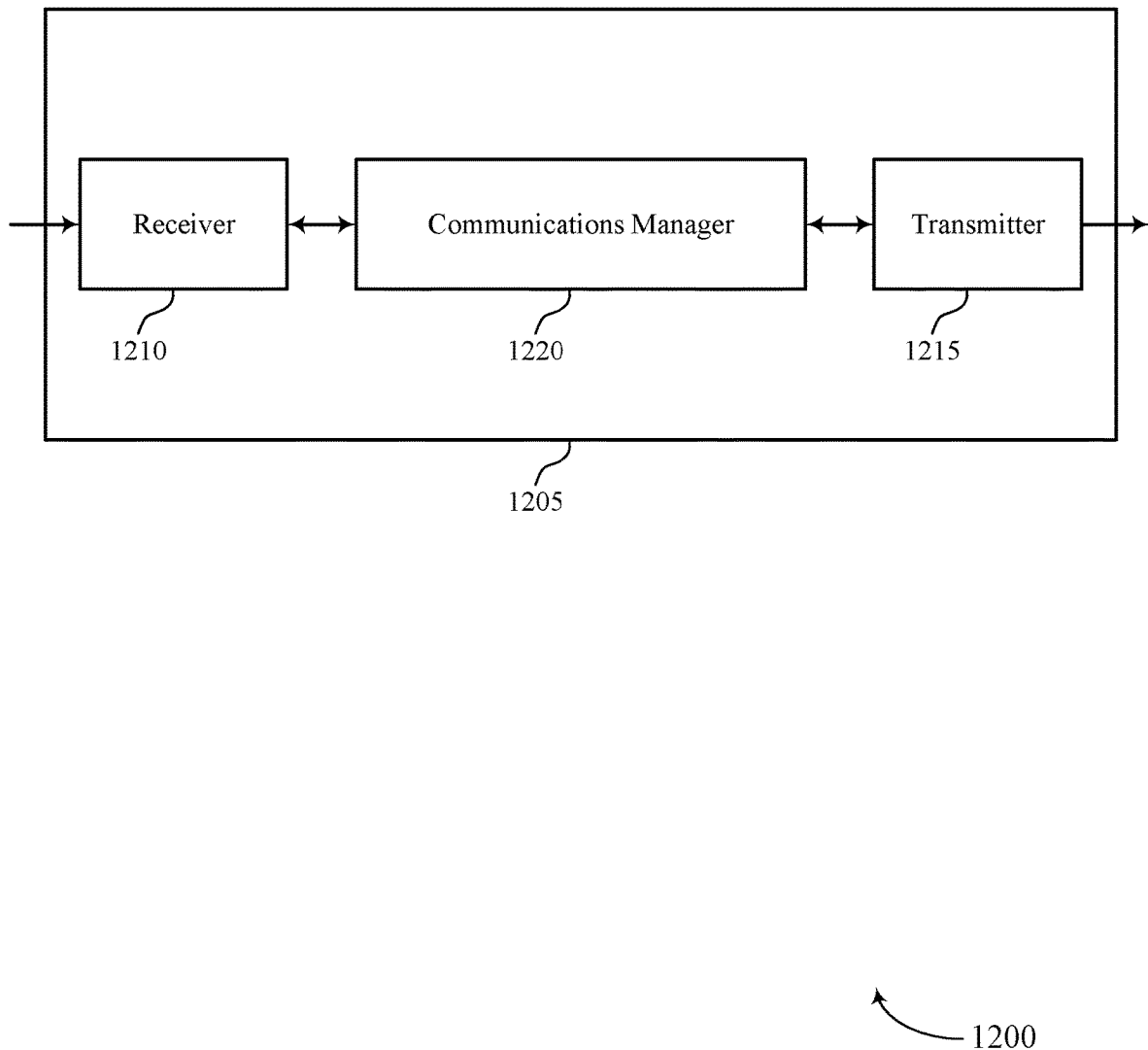
FIGS. 12 and 13 show block diagrams of devices that support network measurements for enhanced machine learning model training and inference in accordance with aspects of the present disclosure.

FIG. 12 shows a block diagram 1200 of a device 1205 that supports network measurements for enhanced machine learning model training and inference in accordance with aspects of the present disclosure. The device 1205 may be an example of aspects of a base station 105 or an entity of a core network 130 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to network measurements for enhanced machine learning model training and inference). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to network measurements for enhanced machine learning model training and inference). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of network measurements for enhanced machine learning model training and inference as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at one or more network entities within a wireless communications network in accordance with examples as disclosed herein. For example, the communications manager 1220 may be configured as or otherwise support a means for receiving, from a UE, a request for information associated with one or more measurements associated with operation of the wireless communications network. The communications manager 1220 may be configured as or otherwise support a means for transmitting, to the UE and in response to the request, the information associated with the one or more measurements, where the information is for performing a training or inference operation using a machine learning model at the UE.

By including or configuring the communications manager 1220 in accordance with examples as described herein, the device 1205 (e.g., a processor controlling or otherwise coupled to the receiver 1210, the transmitter 1215, the communications manager 1220, or any combination thereof) may support techniques for more efficient utilization of communication resources.

Figure 13:
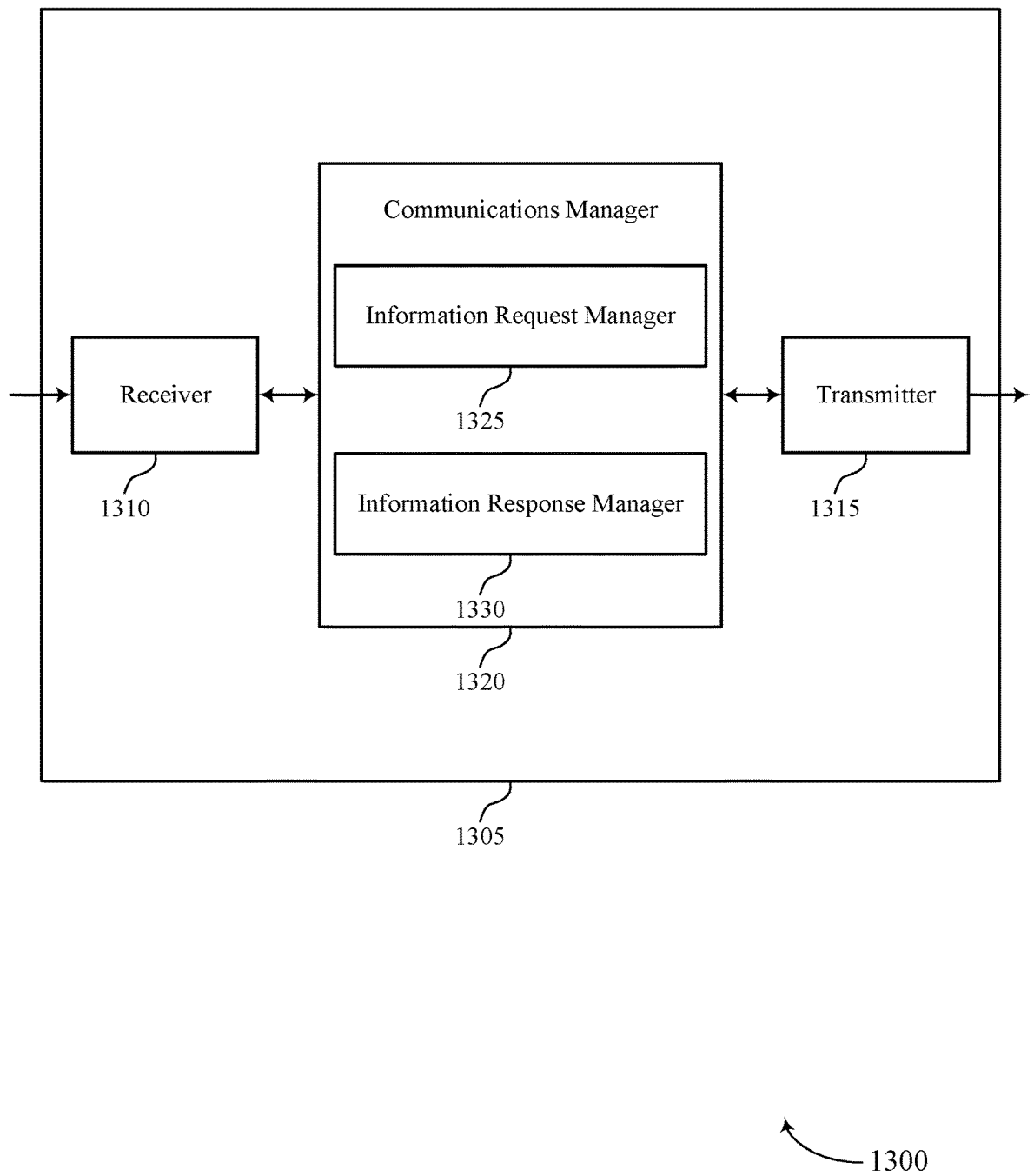

FIG. 13 shows a block diagram 1300 of a device 1305 that supports network measurements for enhanced machine learning model training and inference in accordance with aspects of the present disclosure. The device 1305 may be an example of aspects of a device 1205, a base station 105, or an entity of a core network 130 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to network measurements for enhanced machine learning model training and inference). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to network measurements for enhanced machine learning model training and inference). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of network measurements for enhanced machine learning model training and inference as described herein. For example, the communications manager 1320 may include an information request manager 1325 an information response manager 1330, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at one or more network entities within a wireless communications network in accordance with examples as disclosed herein. The information request manager 1325 may be configured as or otherwise support a means for receiving, from a UE, a request for information associated with one or more measurements associated with operation of the wireless communications network. The information response manager 1330 may be configured as or otherwise support a means for transmitting, to the UE and in response to the request, the information associated with the one or more measurements, where the information is for performing a training or inference operation using a machine learning model at the UE.

Figure 14:
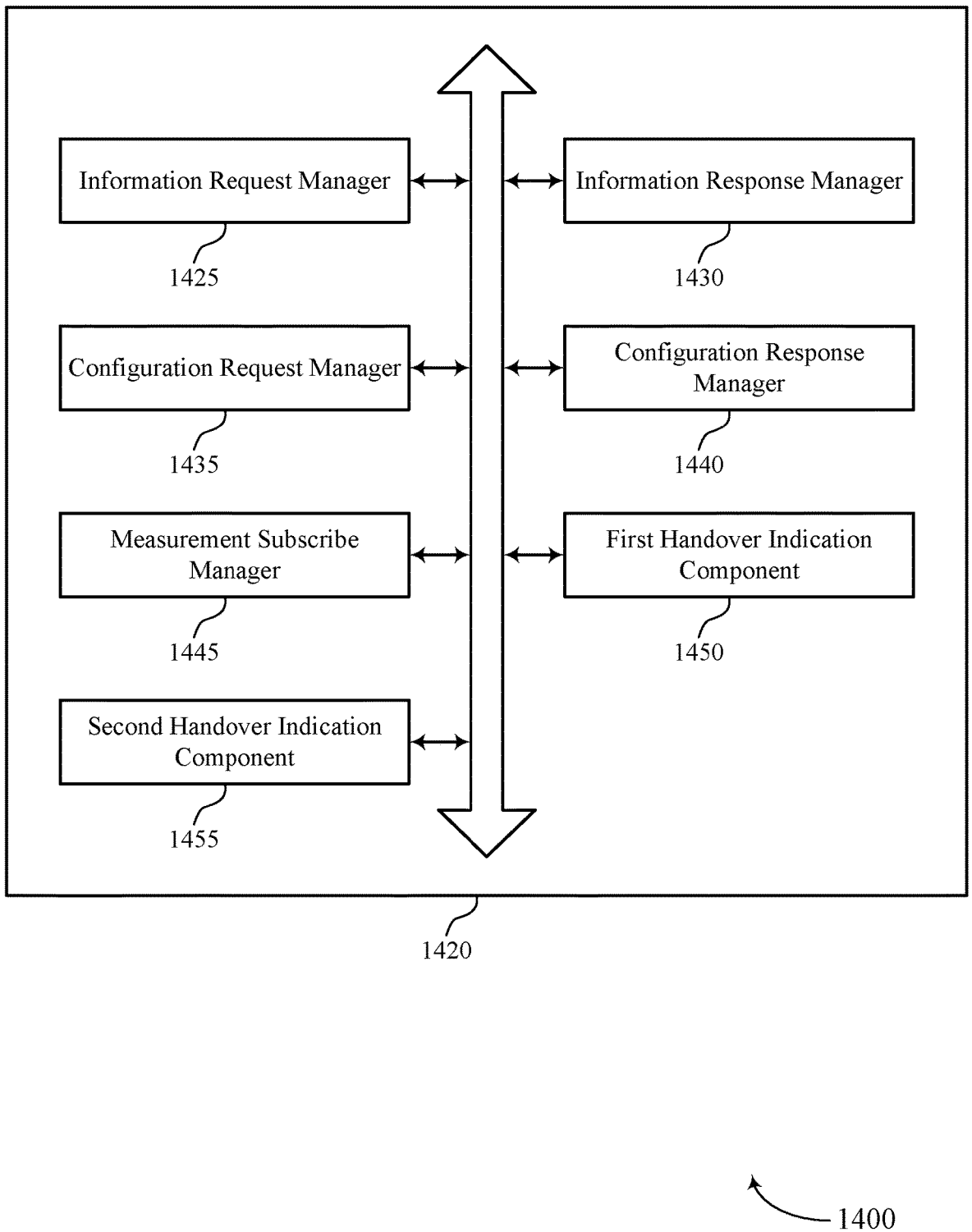
FIG. 14 shows a block diagram of a communications manager that supports network measurements for enhanced machine learning model training and inference in accordance with aspects of the present disclosure.

FIG. 14 shows a block diagram 1400 of a communications manager 1420 that supports network measurements for enhanced machine learning model training and inference in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of network measurements for enhanced machine learning model training and inference as described herein. For example, the communications manager 1420 may include an information request manager 1425, an information response manager 1430, a configuration request manager 1435, a configuration response manager 1440, a measurement subscribe manager 1445, a first handover indication component 1450, a second handover indication component 1455, or any combination thereof. Each of these components may communicate, directly or indirectly, with one another (e.g., via one or more buses).

The communications manager 1420 may support wireless communication at one or more network entities within a wireless communications network in accordance with examples as disclosed herein. The information request manager 1425 may be configured as or otherwise support a means for receiving, from a UE, a request for information associated with one or more measurements associated with operation of the wireless communications network. The information response manager 1430 may be configured as or otherwise support a means for transmitting, to the UE and in response to the request, the information associated with the one or more measurements, where the information is for performing a training or inference operation using a machine learning model at the UE.

In some examples, the configuration request manager 1435 may be configured as or otherwise support a means for receiving, from the UE, a network measurement configuration request indicating the one or more measurements. In some examples, the configuration response manager 1440 may be configured as or otherwise support a means for transmitting, to the UE, a network measurement configuration response indicating an acceptance to measure the one or more measurements, where receiving the request for information is in response to the network measurement configuration response.

In some examples, the configuration request manager 1435 may be configured as or otherwise support a means for receiving, from the UE, a network measurement configuration request indicating the one or more measurements. In some examples, the configuration response manager 1440 may be configured as or otherwise support a means for transmitting, to the UE, a network measurement configuration response indicating an acceptance to measure a subset of the one or more measurements, where receiving the request for information includes transmitting the request for information associated with the subset of the one or more measurements.

In some examples, the measurement subscribe manager 1445 may be configured as or otherwise support a means for receiving, from the UE, a request to subscribe to a network measurement configuration associated with the one or more measurements, where transmitting the information associated with the one or more measurements is in response to the request to subscribe to the network measurement configuration. In some examples, the measurement subscribe manager 1445 may be configured as or otherwise support a means for receiving, from the UE, a request to unsubscribe from a subset of the one or more measurements associated with the network measurement configuration.

In some examples, the network measurement configuration includes at least one of an indication of one or more parameters, an indication of a periodic notification process, an indication of an event-triggered notification process, or any combination thereof. In some examples, to support receiving a request for information, the information request manager 1425 may be configured as or otherwise support a means for receiving the request for information using a user plane connection via an IP address of a network entity.

In some examples, to support receiving a request for information, the information request manager 1425 may be configured as or otherwise support a means for receiving the request for information using a control plane connection via a coordination entity associated with a network entity. In some examples, to support receiving a request for information, the information request manager 1425 may be configured as or otherwise support a means for receiving the request for information using a service-based connection based on an application programming interface associated with a network entity.

In some examples, the first handover indication component 1450 may be configured as or otherwise support a means for transmitting, to the UE, an indication to perform a handover operation from a first base station to a second base station. In some examples, the second handover indication component 1455 may be configured as or otherwise support a means for transmitting, to the second base station and in response to the handover operation, an indication of the request for information associated with the one or more measurements associated with operation of the wireless communications network.

In some examples, the one or more network entities include at least one of an ADRF, a CU-DR function, a CU of a base station, a DU of a base station, an AMF, an SMF, an NWDAF, or any combination thereof. In some examples, the request for information includes at least one of a UE identifier, a list of the one or more measurements, a data response configuration, a measurement period, a measurement interval, or any combination thereof.

Figure 15:
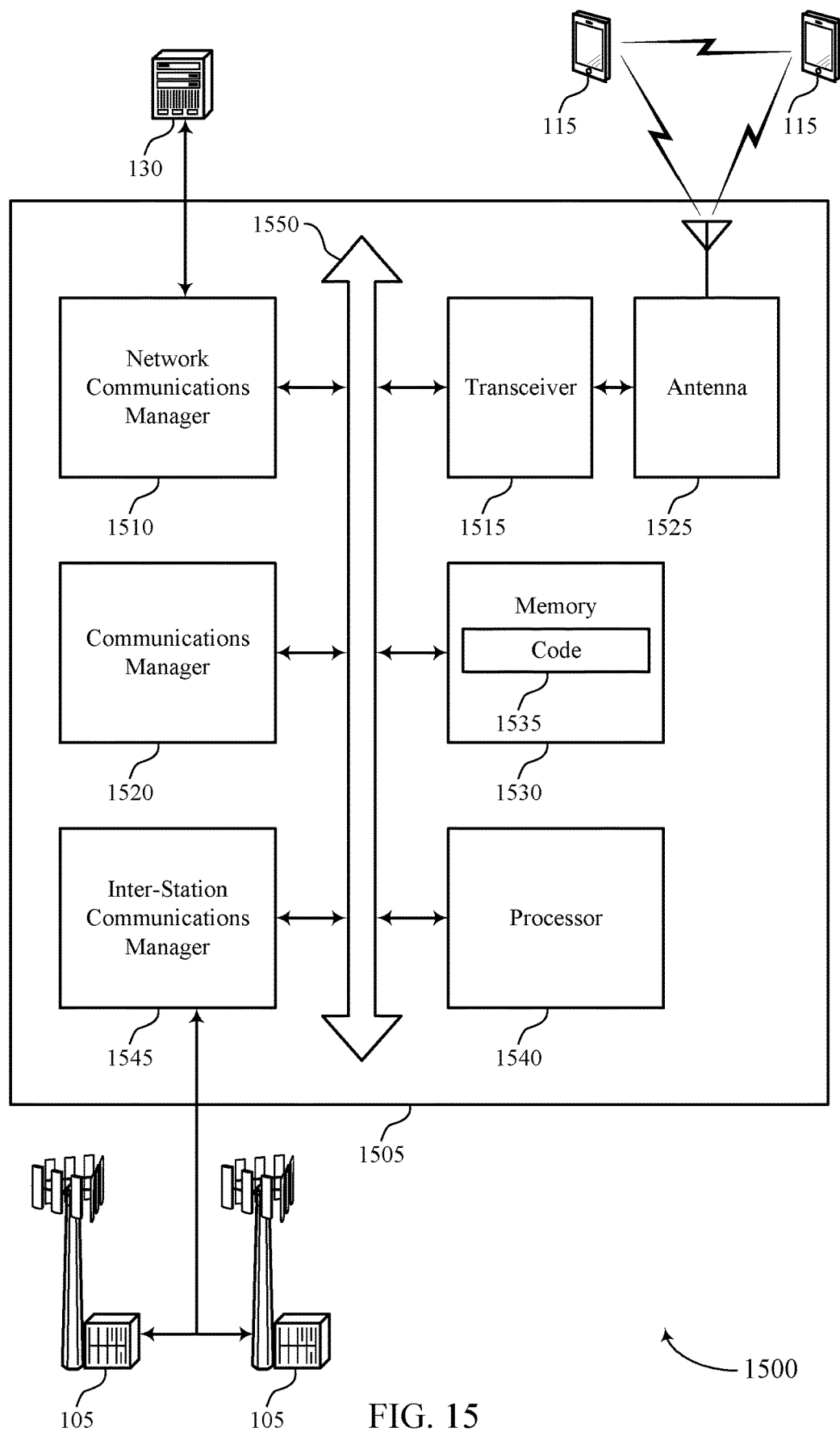
FIG. 15 shows a diagram of a system including a device that supports network measurements for enhanced machine learning model training and inference in accordance with aspects of the present disclosure.

FIG. 15 shows a diagram of a system 1500 including a device 1505 that supports network measurements for enhanced machine learning model training and inference in accordance with aspects of the present disclosure. The device 1505 may be an example of or include the components of a device 1205, a device 1305, a base station 105, or an entity of a core network 130 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting network measurements for enhanced machine learning model training and inference). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at one or more network entities within a wireless communications network in accordance with examples as disclosed herein. For example, the communications manager 1520 may be configured as or otherwise support a means for receiving, from a UE, a request for information associated with one or more measurements associated with operation of the wireless communications network. The communications manager 1520 may be configured as or otherwise support a means for transmitting, to the UE and in response to the request, the information associated with the one or more measurements, where the information is for performing a training or inference operation using a machine learning model at the UE.

By including or configuring the communications manager 1520 in accordance with examples as described herein, the device 1505 may support techniques for improved communication reliability, improved user experience related to reduced processing, more efficient utilization of communication resources, improved coordination between devices, improved utilization of processing capability.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of network measurements for enhanced machine learning model training and inference as described herein, or the processor 1540 and the memory 1530 may be otherwise configured to perform or support such operations.

Figure 16:
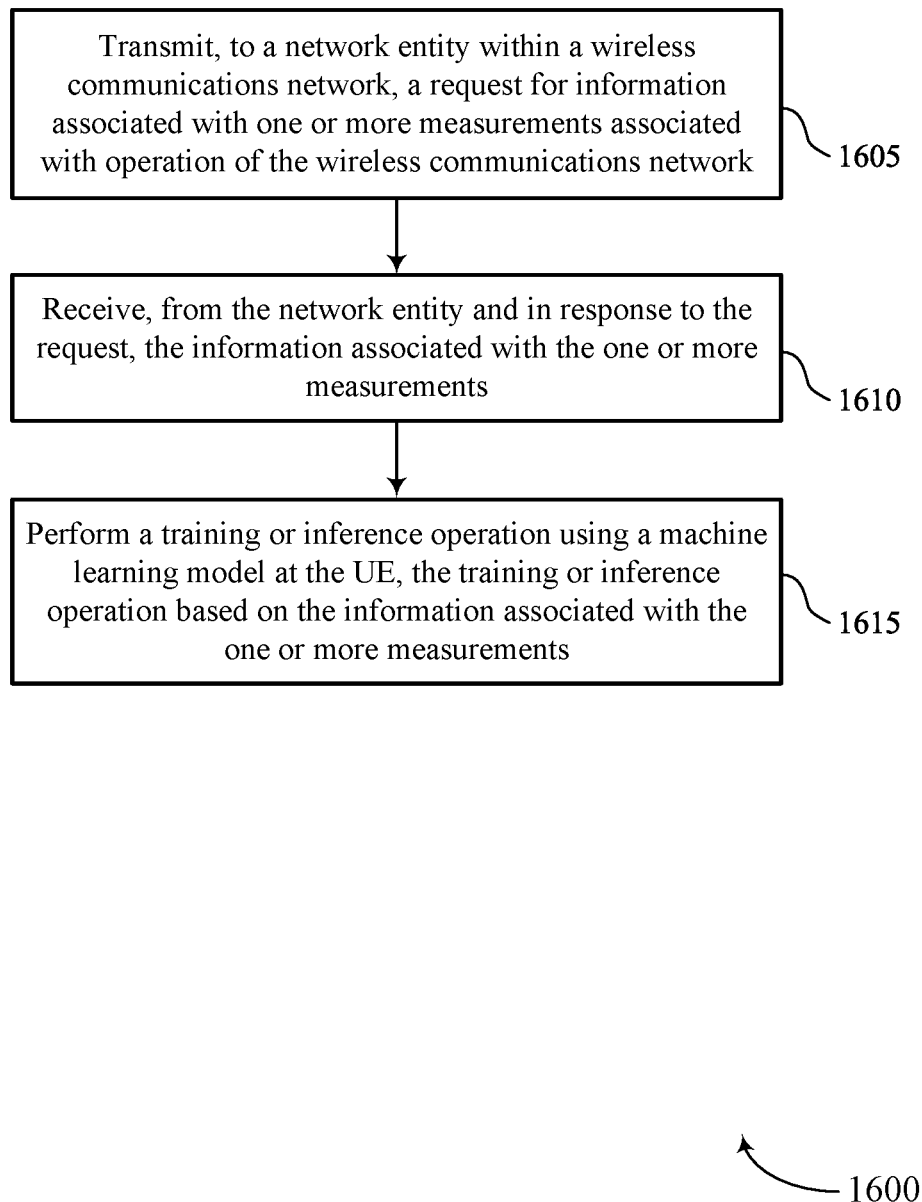
FIGS. 16 through 19 show flowcharts illustrating methods that support network measurements for enhanced machine learning model training and inference in accordance with aspects of the present disclosure.

FIG. 16 shows a flowchart illustrating a method 1600 that supports network measurements for enhanced machine learning model training and inference in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include transmitting, to a network entity within a wireless communications network, a request for information associated with one or more measurements associated with operation of the wireless communications network. The operations of 1605 may be performed in accordance with examples as disclosed herein. In some examples, aspects of the operations of 1605 may be performed by an information request component 1025 as described with reference to FIG. 10.

At 1610, the method may include receiving, from the network entity and in response to the request, the information associated with the one or more measurements. The operations of 1610 may be performed in accordance with examples as disclosed herein. In some examples, aspects of the operations of 1610 may be performed by an information response component 1030 as described with reference to FIG. 10.

At 1615, the method may include performing a training or inference operation using a machine learning model at the UE, the training or inference operation based on the information associated with the one or more measurements. The operations of 1615 may be performed in accordance with examples as disclosed herein. In some examples, aspects of the operations of 1615 may be performed by a model component 1035 as described with reference to FIG. 10.

Figure 17:
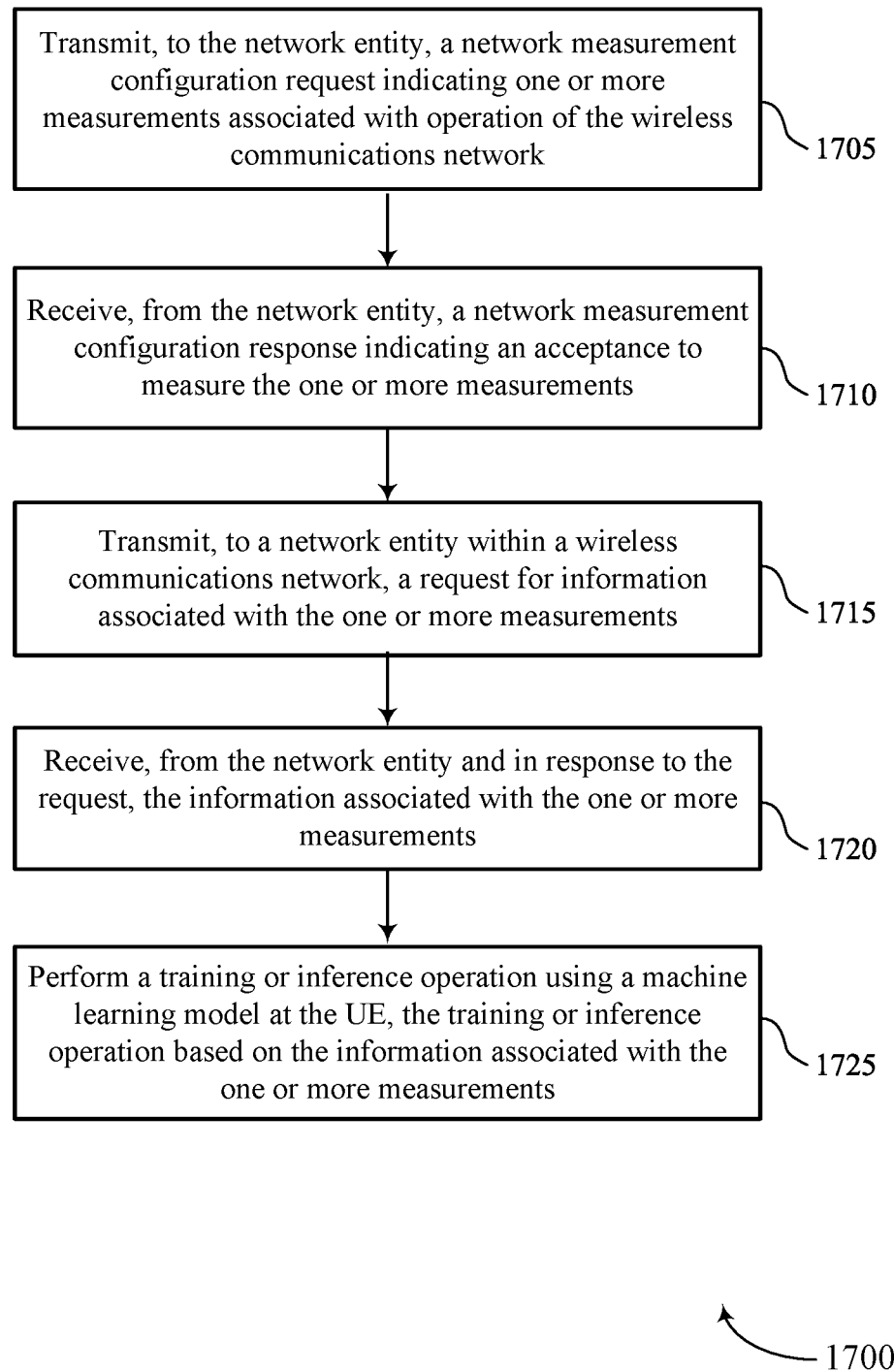

FIG. 17 shows a flowchart illustrating a method 1700 that supports network measurements for enhanced machine learning model training and inference in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include transmitting, to the network entity, a network measurement configuration request indicating one or more measurements associated with operation of the wireless communications network. The operations of 1705 may be performed in accordance with examples as disclosed herein. In some examples, aspects of the operations of 1705 may be performed by a configuration request component 1040 as described with reference to FIG. 10.

At 1710, the method may include receiving, from the network entity, a network measurement configuration response indicating an acceptance to measure the one or more measurements. The operations of 1710 may be performed in accordance with examples as disclosed herein. In some examples, aspects of the operations of 1710 may be performed by a configuration response component 1045 as described with reference to FIG. 10.

At 1715, the method may include transmitting, to a network entity within a wireless communications network, a request for information associated with the one or more measurements. The operations of 1715 may be performed in accordance with examples as disclosed herein. In some examples, aspects of the operations of 1715 may be performed by an information request component 1025 as described with reference to FIG. 10.

At 1720, the method may include receiving, from the network entity and in response to the request, the information associated with the one or more measurements. The operations of 1720 may be performed in accordance with examples as disclosed herein. In some examples, aspects of the operations of 1720 may be performed by an information response component 1030 as described with reference to FIG. 10.

At 1725, the method may include performing a training or inference operation using a machine learning model at the UE, the training or inference operation based on the information associated with the one or more measurements. The operations of 1725 may be performed in accordance with examples as disclosed herein. In some examples, aspects of the operations of 1725 may be performed by a model component 1035 as described with reference to FIG. 10.

Figure 18:
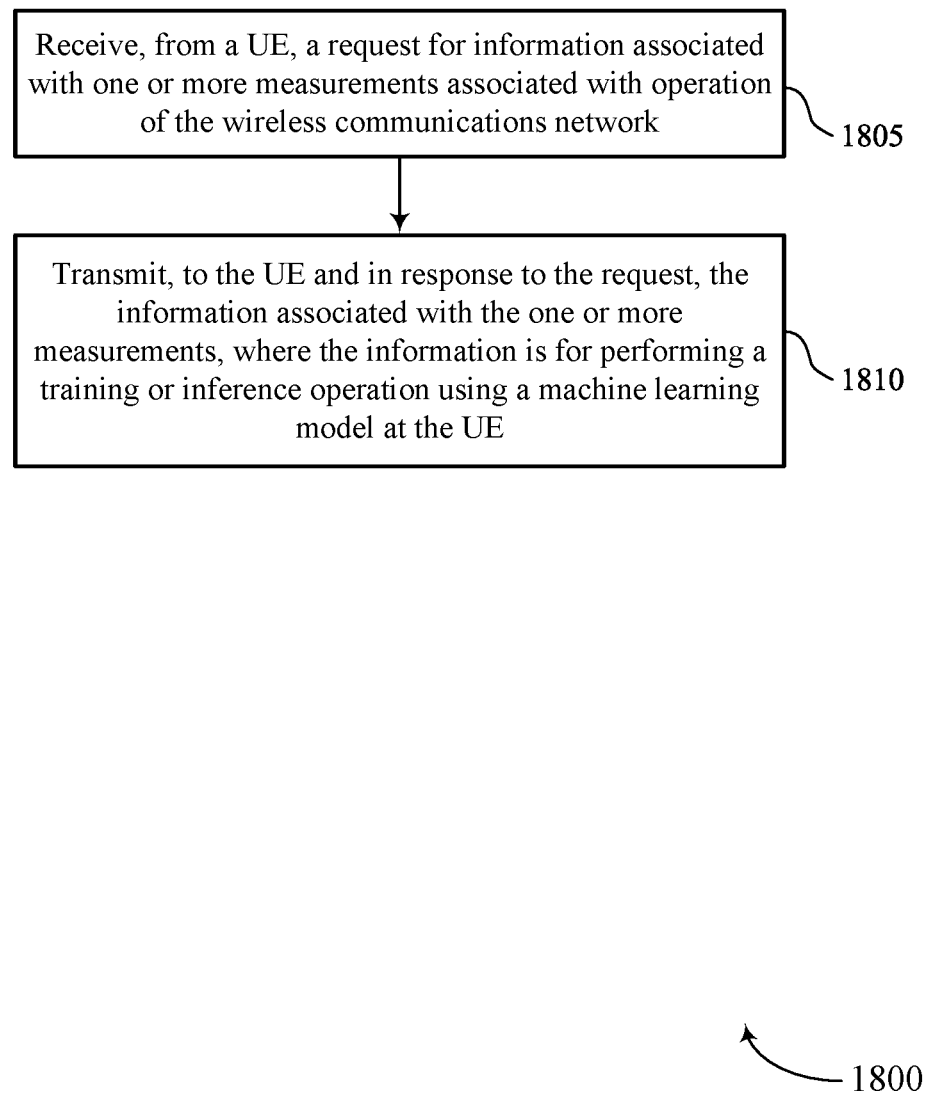

FIG. 18 shows a flowchart illustrating a method 1800 that supports network measurements for enhanced machine learning model training and inference in accordance with aspects of the present disclosure. The operations of the method 1800 may be implemented by a network entity or its components as described herein. For example, the operations of the method 1800 may be performed by a base station 105 or an entity of a core network 130 as described with reference to FIGS. 1 through 7 and 12 through 15. In some examples, a network entity may execute a set of instructions to control the functional elements of the network entity to perform the described functions. Additionally or alternatively, the network entity may perform aspects of the described functions using special-purpose hardware.

At 1805, the method may include receiving, from a UE, a request for information associated with one or more measurements associated with operation of the wireless communications network. The operations of 1805 may be performed in accordance with examples as disclosed herein. In some examples, aspects of the operations of 1805 may be performed by an information request manager 1425 as described with reference to FIG. 14.

At 1810, the method may include transmitting, to the UE and in response to the request, the information associated with the one or more measurements, where the information is for performing a training or inference operation using a machine learning model at the UE. The operations of 1810 may be performed in accordance with examples as disclosed herein. In some examples, aspects of the operations of 1810 may be performed by an information response manager 1430 as described with reference to FIG. 14.

Figure 19:
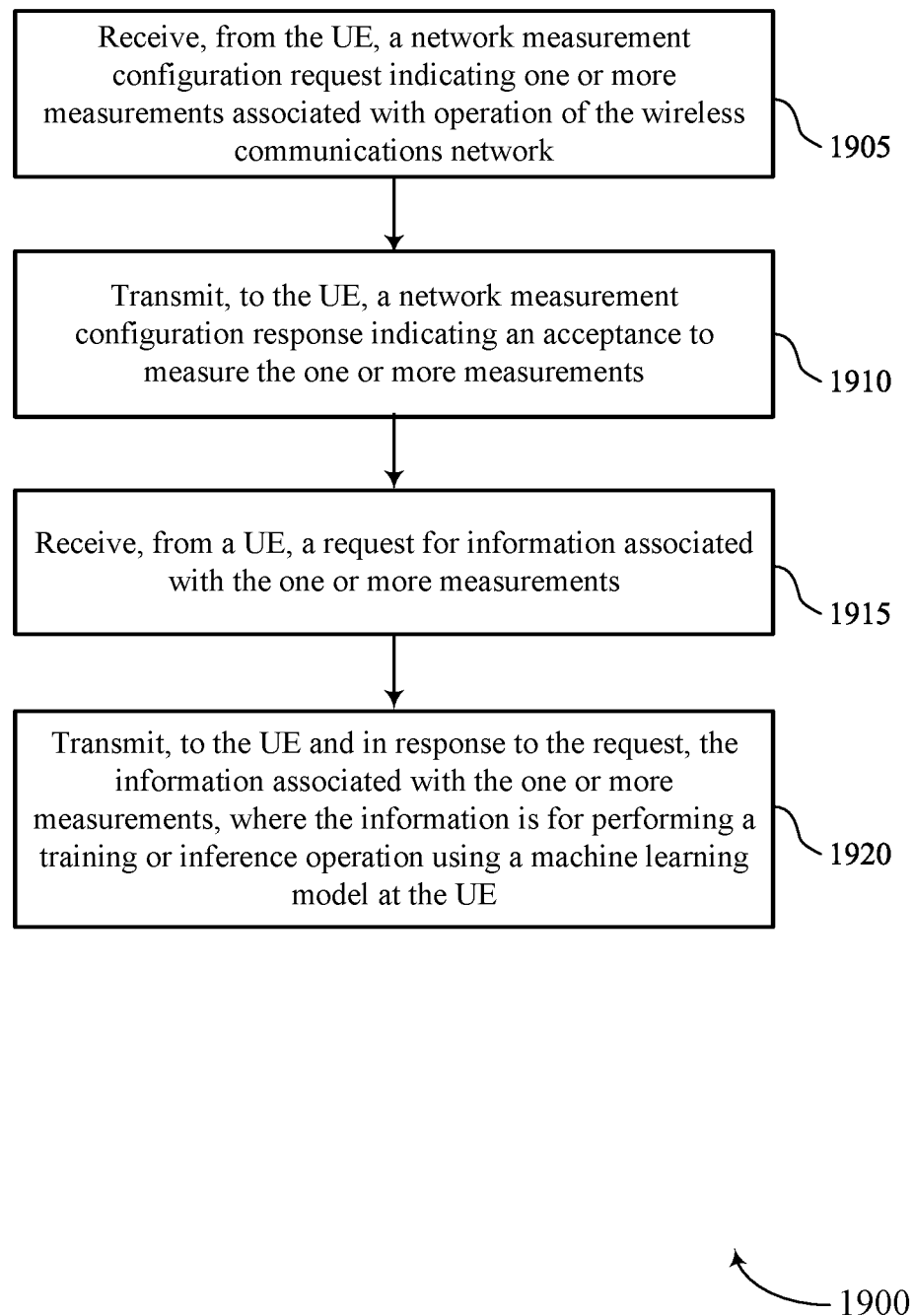

FIG. 19 shows a flowchart illustrating a method 1900 that supports network measurements for enhanced machine learning model training and inference in accordance with aspects of the present disclosure. The operations of the method 1900 may be implemented by a network entity or its components as described herein. For example, the operations of the method 1900 may be performed by a base station 105 or an entity of a core network 130 as described with reference to FIGS. 1 through 7 and 12 through 15. In some examples, a network entity may execute a set of instructions to control the functional elements of the network entity to perform the described functions. Additionally or alternatively, the network entity may perform aspects of the described functions using special-purpose hardware.

At 1905, the method may include receiving, from the UE, a network measurement configuration request indicating one or more measurements associated with operation of the wireless communications network. The operations of 1905 may be performed in accordance with examples as disclosed herein. In some examples, aspects of the operations of 1905 may be performed by a configuration request manager 1435 as described with reference to FIG. 14.

At 1910, the method may include transmitting, to the UE, a network measurement configuration response indicating an acceptance to measure the one or more measurements. The operations of 1910 may be performed in accordance with examples as disclosed herein. In some examples, aspects of the operations of 1910 may be performed by a configuration response manager 1440 as described with reference to FIG. 14.

At 1915, the method may include receiving, from a UE, a request for information associated with the one or more measurements. The operations of 1915 may be performed in accordance with examples as disclosed herein. In some examples, aspects of the operations of 1915 may be performed by an information request manager 1425 as described with reference to FIG. 14.

At 1920, the method may include transmitting, to the UE and in response to the request, the information associated with the one or more measurements, where the information is for performing a training or inference operation using a machine learning model at the UE. The operations of 1920 may be performed in accordance with examples as disclosed herein. In some examples, aspects of the operations of 1920 may be performed by an information response manager 1430 as described with reference to FIG. 14.

The following provides an overview of aspects of the present disclosure:

Aspect 1: A method for wireless communication at a UE, comprising: transmitting, to a network entity within a wireless communications network, a request for information associated with one or more measurements associated with operation of the wireless communications network; receiving, from the network entity and in response to the request, the information associated with the one or more measurements; and performing a training or inference operation using a machine learning model at the UE, the training or inference operation based at least in part on the information associated with the one or more measurements.

Aspect 2: The method of aspect 1, further comprising: transmitting, to the network entity, a network measurement configuration request indicating the one or more measurements; and receiving, from the network entity, a network measurement configuration response indicating an acceptance to measure the one or more measurements, wherein transmitting the request for information is in response to the network measurement configuration response.

Aspect 3: The method of any of aspects 1 through 2, further comprising: transmitting, to the network entity, a network measurement configuration request indicating the one or more measurements; and receiving, from the network entity, a network measurement configuration response indicating an acceptance to measure a subset of the one or more measurements, wherein transmitting the request for information comprises transmitting the request for information associated with the subset of the one or more measurements.

Aspect 4: The method of any of aspects 1 through 3, further comprising: transmitting, to the network entity, a request to subscribe to a network measurement configuration associated with the one or more measurements, wherein receiving the information associated with the one or more measurements is in response to the request to subscribe to the network measurement configuration.

Aspect 5: The method of aspect 4, further comprising: transmitting, to the network entity, a request to unsubscribe from a subset of the one or more measurements associated with the network measurement configuration.

Aspect 6: The method of any of aspects 4 through 5, wherein the request to subscribe to the network measurement configuration comprises at least one of an indication of the one or more parameters, an indication of a periodic notification process, an indication of an event-triggered notification process, or any combination thereof.

Aspect 7: The method of any of aspects 1 through 6, wherein transmitting a request for information further comprises: transmitting the request for information using a user plane connection via an Internet Protocol (IP) address of the network entity.

Aspect 8: The method of any of aspects 1 through 7, wherein transmitting a request for information further comprises: transmitting the request for information using a control plane connection via a coordination entity associated with the network entity.

Aspect 9: The method of any of aspects 1 through 8, wherein transmitting a request for information further comprises: transmitting the request for information using a service-based connection based at least in part on an application programming interface associated with the network entity.

Aspect 10: The method of any of aspects 1 through 9, further comprising: predicting a throughput value, a network load value, a downlink queue length, a downlink delay value, or any combination thereof based at least in part on performing the training or inference operation.

Aspect 11: The method of any of aspects 1 through 10, wherein the network entity comprises at least one of an analytics and data repository function, a centralized unit data repository function, a centralized unit of a base station, a distributed unit of a base station, an access and mobility management function, a session management function, a network data analytics function, or any combination thereof.

Aspect 12: The method of any of aspects 1 through 11, wherein the request for information comprises at least one of a UE identifier, a list of the one or more measurements, a data response configuration, a measurement period, a measurement interval, or any combination thereof.

Aspect 13: A method for wireless communication at one or more network entities within a wireless communications network, comprising: receiving, from a UE, a request for information associated with one or more measurements associated with operation of the wireless communications network; and transmitting, to the UE and in response to the request, the information associated with the one or more measurements, wherein the information is for performing a training or inference operation using a machine learning model at the UE.

Aspect 14: The method of aspect 13, further comprising: receiving, from the UE, a network measurement configuration request indicating the one or more measurements; and transmitting, to the UE, a network measurement configuration response indicating an acceptance to measure the one or more measurements, wherein receiving the request for information is in response to the network measurement configuration response.

Aspect 15: The method of any of aspects 13 through 14, further comprising: receiving, from the UE, a network measurement configuration request indicating the one or more measurements; and transmitting, to the UE, a network measurement configuration response indicating an acceptance to measure a subset of the one or more measurements, wherein receiving the request for information comprises transmitting the request for information associated with the subset of the one or more measurements.

Aspect 16: The method of any of aspects 13 through 15, further comprising: receiving, from the UE, a request to subscribe to a network measurement configuration associated with the one or more measurements, wherein transmitting the information associated with the one or more measurements is in response to the request to subscribe to the network measurement configuration.

Aspect 17: The method of aspect 16, further comprising: receiving, from the UE, a request to unsubscribe from a subset of the one or more measurements associated with the network measurement configuration.

Aspect 18: The method of any of aspects 16 through 17, wherein the network measurement configuration comprises at least one of an indication of the one or more parameters, an indication of a periodic notification process, an indication of an event-triggered notification process, or any combination thereof.

Aspect 19: The method of any of aspects 13 through 18, wherein receiving a request for information further comprises: receiving the request for information using a user plane connection via an Internet Protocol (IP) address of a network entity.

Aspect 20: The method of any of aspects 13 through 19, wherein receiving a request for information further comprises: receiving the request for information using a control plane connection via a coordination entity associated with a network entity.

Aspect 21: The method of any of aspects 13 through 20, wherein receiving a request for information further comprises: receiving the request for information using a service-based connection based at least in part on an application programming interface associated with a network entity.

Aspect 22: The method of any of aspects 13 through 21, further comprising: transmitting, to the UE, an indication to perform a handover operation from a first base station to a second base station; and transmitting, to the second base station and in response to the hand-over operation, an indication of the request for information associated with the one or more measurements associated with operation of the wireless communications network.

Aspect 23: The method of any of aspects 13 through 22, wherein the one or more network entities comprise at least one of an analytics and data repository function, a centralized unit data repository function, a centralized unit of a base station, a distributed unit of a base station, an access and mobility management function, a session management function, a network data analytics function, or any combination thereof.

Aspect 24: The method of any of aspects 13 through 23, wherein the request for information comprises at least one of a UE identifier, a list of the one or more measurements, a data response configuration, a measurement period, a measurement interval, or any combination thereof.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at one or more network entities within a wireless communications network, comprising a processor; memory coupled with the processor; and instructions stored in the memory and executable by the processor to cause the apparatus to perform a method of any of aspects 13 through 24.

Aspect 29: An apparatus for wireless communication at one or more network entities within a wireless communications network, comprising at least one means for performing a method of any of aspects 13 through 24.

Aspect 30: A non-transitory computer-readable medium storing code for wireless communication at one or more network entities within a wireless communications network, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   at least one processor;
   memory coupled with the at least one processor; and
   instructions stored in the memory and executable by the at least one processor to cause the apparatus to:
   transmit, to a network entity within a wireless communications network, a network measurement configuration request indicating one or more measurements for collection by the wireless communications network, the one or more measurements for use by a machine learning model at the UE and associated with operation of the wireless communications network;
   receive, from the network entity, a network measurement configuration response indicating an acceptance, by the wireless communications network, to collect at least a subset of the one or more measurements;
   transmit, in response to the network measurement configuration response, a request for data to the network entity, wherein the data requested by the UE is associated with the one or more measurements requested by the UE for collection by the wireless communications network; and
   receive, from the network entity and in response to the request for data, the requested data.

2. The apparatus of claim 1, wherein the instructions are further executable by the at least one processor to cause the apparatus to:
   transmit, to the network entity, a request to subscribe to a network measurement configuration associated with the one or more measurements, wherein receiving the data comprising the one or more measurements is in response to the request to subscribe to the network measurement configuration.

3. The apparatus of claim 2, wherein the instructions are further executable by the at least one processor to cause the apparatus to:
   transmit, to the network entity, a request to unsubscribe from at least a subset of the one or more measurements associated with the network measurement configuration.

4. The apparatus of claim 2, wherein the request to subscribe to the network measurement configuration comprises at least one of an indication of one or more parameters, an indication of a periodic notification process, an indication of an event-triggered notification process, or any combination thereof.

5. The apparatus of claim 1, wherein, to transmit the request for data, the instructions are executable by the at least one processor to cause the apparatus to:
   transmit the request for data using a user plane connection via an Internet Protocol (IP) address of the network entity.

6. The apparatus of claim 1, wherein, to transmit the request for data, the instructions are executable by the at least one processor to cause the apparatus to:
   transmit the request for data using a control plane connection via a coordination entity associated with the network entity.

7. The apparatus of claim 1, wherein, to transmit the request for data, the instructions are executable by the at least one processor to cause the apparatus to:
   transmit the request for data using a service-based connection based at least in part on an application programming interface associated with the network entity.

8. The apparatus of claim 1, wherein the instructions are further executable by the at least one processor to cause the apparatus to:
   predict a throughput value, a network load value, a downlink queue length, a downlink delay value, or any combination thereof based at least in part on performing a training or inference operation using the one or more measurements and the machine learning model.

9. The apparatus of claim 1, wherein the network entity comprises at least one of an analytics and data repository function, a centralized unit data repository function, a centralized unit of a base station, a distributed unit of a base station, an access and mobility management function, a session management function, a network data analytics function, or any combination thereof.

10. The apparatus of claim 1, wherein the request for data comprises at least one of a UE identifier, a list of the one or more measurements, a data response configuration, a measurement period, a measurement interval, or any combination thereof.

11. The apparatus of claim 1, wherein the one or more measurements collected by the wireless communications network and requested by the UE are for a training operation associated with the machine learning model.

12. The apparatus of claim 1, wherein the one or more measurements collected by the wireless communications network and requested by the UE are for an inference operation associated with the machine learning model.

13. An apparatus for wireless communication at one or more network entities within a wireless communications network, comprising:
at least one processor;
memory coupled with the at least one processor; and
instructions stored in the memory and executable by the at least one processor to cause the apparatus to:
receive, from a user equipment (UE) within a wireless communications network, a network measurement configuration request indicating one or more measurements for collection by the wireless communications network, the one or more measurements for use by a machine learning model at the UE and associated with operation of the wireless communications network;
transmit, to the UE, a network measurement configuration response indicating an acceptance, by the wireless communications network, to collect at least a subset of the one or more measurements;
receive, from the UE and in response to the network measurement configuration response, a request for data, wherein the data requested by the UE is associated with the one or more measurements requested by the UE for collection by the wireless communications network; and
transmit, to the UE and in response to the request for data, the requested data.

14. The apparatus of claim 13, wherein the instructions are further executable by the at least one processor to cause the apparatus to:
receive, from the UE, a request to subscribe to a network measurement configuration associated with the one or more measurements, wherein transmitting the data comprising the one or more measurements is in response to the request to subscribe to the network measurement configuration.

15. The apparatus of claim 14, wherein the instructions are further executable by the at least one processor to cause the apparatus to:
receive, from the UE, a request to unsubscribe from at least a subset of the one or more measurements associated with the network measurement configuration.

16. The apparatus of claim 14, wherein the network measurement configuration comprises at least one of an indication of one or more parameters, an indication of a periodic notification process, an indication of an event-triggered notification process, or any combination thereof.

17. The apparatus of claim 13, wherein, to receive the request for data, the instructions are executable by the at least one processor to cause the apparatus to:
receive the request for data using a user plane connection via an Internet Protocol (IP) address of a network entity.

18. The apparatus of claim 13, wherein, to receive the request for data, the instructions are executable by the at least one processor to cause the apparatus to:
receive the request for data using a control plane connection via a coordination entity associated with a network entity.

19. The apparatus of claim 13, wherein, to receive a request for data, the instructions are executable by the at least one processor to cause the apparatus to:
receive the request for data using a service-based connection based at least in part on an application programming interface associated with a network entity.

20. The apparatus of claim 13, wherein the instructions are further executable by the at least one processor to cause the apparatus to:
transmit, to the UE, an indication to perform a handover operation from a first base station to a second base station; and
transmit, to the second base station and in response to the handover operation, an indication of the request for data associated with the one or more measurements associated with the operation of the wireless communications network.

21. The apparatus of claim 13, wherein the one or more network entities comprise at least one of an analytics and data repository function, a centralized unit data repository function, a centralized unit of a base station, a distributed unit of a base station, an access and mobility management function, a session management function, a network data analytics function, or any combination thereof.

22. The apparatus of claim 13, wherein the request for data comprises at least one of a UE identifier, a list of the one or more measurements, a data response configuration, a measurement period, a measurement interval, or any combination thereof.

23. The apparatus of claim 13, wherein the one or more measurements collected by the wireless communications network and requested by the UE are for a training operation associated with the machine learning model.

24. The apparatus of claim 13, wherein the one or more measurements collected by the wireless communications network and requested by the UE are for an inference operation associated with the machine learning model.

25. A method for wireless communication at a user equipment (UE), comprising:
transmitting, to a network entity within a wireless communications network, a network measurement configuration request indicating one or more measurements for collection by the wireless communications network, the one or more measurements for use by a machine learning model at the UE and associated with operation of the wireless communications network;
receiving, from the network entity, a network measurement configuration response indicating an acceptance, by the wireless communications network, to collect at least a subset of the one or more measurements;
transmitting, in response to the network measurement configuration response, a request for data to the network entity, wherein the data requested by the UE is associated with the one or more measurements requested by the UE for collection by the wireless communications network; and
receiving, from the network entity and in response to the request for data, the requested data.

26. A method for wireless communication at one or more network entities within a wireless communications network, comprising:
- receiving, from a user equipment (UE) within a wireless communications network, a network measurement configuration request indicating one or more measurements for collection by the wireless communications network, the one or more measurements for use by a machine learning model at the UE and associated with operation of the wireless communications network;
- transmitting, to the UE, a network measurement configuration response indicating an acceptance, by the wireless communications network, to collect at least a subset of the one or more measurements;
- receiving, from the UE and in response to the network measurement configuration response, a request for data, wherein the data requested by the UE is associated with the one or more measurements requested by the UE for collection by the wireless communications network; and
- transmitting, to the UE and in response to the request for data, the requested data.

* * * * *